United States Patent
Moriyasu et al.

(10) Patent No.: US 8,447,850 B2
(45) Date of Patent: May 21, 2013

(54) MANAGEMENT COMPUTER AND COMPUTER SYSTEM MANAGEMENT METHOD

(75) Inventors: Kengo Moriyasu, Yokohama (JP); Toshihiro Kura, Yokohama (JP); Nobuyoshi Sakai, Zushi (JP)

(73) Assignee: Hitachi, Ltd., Tokyo (JP)

( * ) Notice: Subject to any disclaimer, the term of this patent is extended or adjusted under 35 U.S.C. 154(b) by 177 days.

(21) Appl. No.: 13/133,307

(22) PCT Filed: Feb. 28, 2011

(86) PCT No.: PCT/JP2011/054543
§ 371 (c)(1),
(2), (4) Date: Jun. 7, 2011

(87) PCT Pub. No.: WO2012/117507
PCT Pub. Date: Sep. 7, 2012

(65) Prior Publication Data
US 2012/0221699 A1 Aug. 30, 2012

(51) Int. Cl.
*G06F 15/173* (2006.01)
*G06F 11/00* (2006.01)
(52) U.S. Cl.
USPC .............................. 709/223; 714/2; 709/226
(58) Field of Classification Search .................. None
See application file for complete search history.

(56) References Cited

U.S. PATENT DOCUMENTS

| | | | |
|---|---|---|---|
| 7,401,248 B2 * | 7/2008 | Nakahara et al. | 714/4.1 |
| 8,175,863 B1 * | 5/2012 | Ostermeyer et al. | 703/22 |
| 2005/0193227 A1 | 9/2005 | Nakahara et al. | |

FOREIGN PATENT DOCUMENTS

| | | |
|---|---|---|
| JP | 11-126195 A | 5/1999 |
| JP | 2004-046372 A | 2/2004 |
| JP | 2005-115653 | 4/2005 |
| JP | 2005-234917 A | 9/2005 |
| JP | 2010-224754 A | 10/2010 |

\* cited by examiner

*Primary Examiner* — John B. Walsh
(74) *Attorney, Agent, or Firm* — Foley & Lardner LLP

(57) ABSTRACT

A management computer 3 configures a coordinate plane from a first axis, which denotes a performance value of a virtual machine 1, and a second axis, which denotes a performance value of a volume 2, and partitions this coordinate plane into multiple areas in accordance with a prescribed criterion. The management server computes to which area of the areas a pair configuration of a virtual machine and a logical volume belongs, and stores the result. At a prescribed time, the management server 3 re-evaluates a coordinate of the pair configuration, and determines whether or not an initial area and a latest area match. The management server creates a migration plan so that the latest area matches the initial area.

15 Claims, 34 Drawing Sheets

FIG. 6

Partition policy table (initial setting) — T31

| Area ID (C310) | Area name (C311) | Virtual machine Performance lower limit (C312) | Virtual machine performance upper limit (C313) | Volume performance lower limit (C314) | Volume performance upper limit (C315) |
|---|---|---|---|---|---|
| A1 | DB configuration | 50% | 100% | 50% | 100% |
| A2 | Scientific calculation | 50% | 100% | 0% | 100% |
| A3 | Backup | 0% | 50% | 50% | 100% |
| A4 | E-mail | 0% | 50% | 50% | 100% |

FIG. 7

Coordinates table (initial setting) — T32

| Coordinate ID C320 | Coordinate name C321 | Virtual machine ID C322 | Volume ID C323 | Initial area ID C324 | Allocation area ID C325 | Coordinate status C326 |
|---|---|---|---|---|---|---|
| C1 | Ca | H1 | V1 | A1 | A1 | Match |
| C2 | Cb | H2 | — | — | A1, A2 | — |
| C3 | Cc | H3 | V2 | A1 | A1 | Match |
| C4 | Cd | H4 | V3 | A2 | A2 | Match |
| C5 | Ce | H5 | — | — | A1, A2 | — |
| C6 | Cf | H6 | — | — | A1, A2 | — |
| C7 | Cg | H7 | V4 | A3 | A3 | Match |
| C8 | Ch | H8 | — | — | A3, A4 | — |

FIG. 8

Virtual machine table + virtual machine performance table (initial settings) T33, T35

| C330 (C350) Virtual machine ID | C331 Virtual machine name | C332 Virtualization server name | C351 CPU (GHz) | C352 No. of processors | C353 Benchmark score | C354 Static performance value | C355 Dynamic performance value |
|---|---|---|---|---|---|---|---|
| H1 | Host A | VServer A | 2.00 | 1 | — | 100 | — |
| H2 | Empty A | VServer A | 2.00 | 1 | — | 100 | — |
| H3 | Host B | VServer B | 1.86 | 1 | — | 71.42857143 | — |
| H4 | Host C | VServer B | 1.86 | 1 | — | 71.42857143 | — |
| H5 | Empty B | VServer B | 1.86 | 1 | — | 71.42857143 | — |
| H6 | Empty C | VServer B | 1.86 | 1 | — | 71.42857143 | — |
| H7 | Host D | VServer C | 1.6 | 1 | — | 0 | — |
| H8 | Empty D | VServer C | 1.6 | 1 | — | 0 | — |

FIG. 9

Volume table + volume performance table (initial settings) T34, T36

| C340 (C360) | C341 | C342 | C361 | C362 | C363 | C364 |
|---|---|---|---|---|---|---|
| Volume ID | LDEV ID | Storage name | Drive type | IOPS | Static performance value | Dynamic performance value |
| V1 | 00:00:01 | Storage A | SSD | — | 100 | — |
| V2 | 00:0A:02 | Storage A | SATA | — | 66.66666667 | — |
| V3 | 15 | Storage B | Unknown | — | 0 | — |
| V4 | 21 | Storage C | SATA | — | 66.66666667 | — |

FIG. 10

| Drive type performance ranking ||
|---|---|
| Drive type | Performance ranking |
| SSD | 1 |
| FC/SAS | 2 |
| SATA | 3 |
| Unknown | 4 |

System configuration coordinates GP11

[Scatter plot: VM performance (y-axis, 0-100) vs Volume performance (x-axis, 0-100), with quadrant lines at 50. Points labeled 1, 2, 3, 4.]

| Summary GP12 | |
|---|---|
| VM performance value definition | CPU * No. of processors: 100% |
| Volume performance value definition | Drive type: 100% |
| Ranking method | Percentile |
| No. of areas | 4 |
| No. of virtual machines | 6 |
| No. of volumes | 6 |
| No. of pairs | Match | 5 |
| | Migration-in progress | 0 |
| | No match | 0 |

GP13

| Policy | | VM Th | | Vol Th | |
|---|---|---|---|---|---|
| Area ID | Coordinate Area name | Upper limit | Lower limit | Upper limit | Lower limit |
| A1 | DB configuration | 100% | 50% | 100% | 50% |
| A2 | Scientific calculation | 100% | 0% | 50% | 0% |
| A3 | Backup | 50% | 0% | 100% | 50% |
| A4 | E-mail | 50% | 50% | 50% | 0% |

FIG. 12

System configuration coordinates plan GP21

(chart: VM performance vs Volume performance, axes 0–100, quadrant labels "2" and "1")

Basic settings GP22
Virtual machine performance value definition:
CPU * No. of processors  ▽   100 %   [+]   [−]
Please select  ▽   0 %

Volume performance value definition:
Drive type  ▽   100 %   [+]

Performance ranking method:
Percentile  ▽

Partition policy GP23
Area ID: A1
Area name: DB configuration
VM performance threshold: Upper limit 100 %   Lower limit 50 %
Volume performance threshold: Upper limit 100 %   Lower limit 50 %

Area ID: A2
Area name: Scientific calculation
VM performance threshold: Upper limit 100 %   Lower limit 50 %

| # | Data name | Value |
|---|---|---|
| 1 | Coordinate ID | C1 |
| 2 | Coordinate name | P |
| 3 | VM ID | H1 |
| 4 | Volume ID | V1 |
| 5 | Initial area ID | A1 |
| 6 | Allocation area ID | A1 |
| 7 | Coordinate status | Match |

T32

| # | Data name | Value |
|---|---|---|
| 1 | Volume ID | V5 |
| 2 | Drive type | SSD |
| 3 | IOPS | - |
| 4 | Volume static performance value | 100.00 |
| 5 | Volume dynamic performance value | - |

Virtual machine table + virtual machine performance table (resource augmentation) T33, T35

| C330 (C350) Virtual machine ID | C331 Virtual machine name | C332 Virtualization server name | C351 CPU (GHz) | C352 No. of processors | C353 Benchmark score | C354 Static Performance value | C355 Dynamic Performance value |
|---|---|---|---|---|---|---|---|
| H1 | Host A | VServer A | 2.00 | 1 | — | 63.63636364 | — |
| H2 | Empty A | VServer A | 2.00 | 1 | — | 63.63636364 | — |
| H3 | Host B | VServer B | 1.86 | 1 | — | 45.45454545 | — |
| H4 | Host C | VServer B | 1.86 | 1 | — | 45.45454545 | — |
| H5 | Empty B | VServer B | 1.86 | 1 | — | 45.45454545 | — |
| H6 | Empty C | VServer B | 1.86 | 1 | — | 45.45454545 | — |
| H7 | Host D | VServer C | 1.6 | 1 | — | 0 | — |
| H8 | Empty D | VServer C | 1.6 | 1 | — | 0 | — |
| H9 | Host E | VServer D | 2.33 | 1 | — | 100 | — |
| H10 | Empty E | VServer D | 2.33 | 1 | — | 100 | — |
| H11 | Empty F | VServer D | 2.33 | 1 | — | 100 | — |
| H12 | Empty G | VServer D | 2.33 | 1 | — | 100 | — |

FIG. 24

Volume table + volume performance table (resource augmentation) T34, T36

| Volume ID C340 (C360) | LDEV ID C341 | Storage name C342 | Drive type C361 | IOPS C362 | Static performance value C363 | Dynamic performance value C364 |
|---|---|---|---|---|---|---|
| V1 | 00:00:01 | Storage A | SSD | – | 100 | – |
| V2 | 00:0A:02 | Storage A | SATA | – | 28.57142857 | – |
| V3 | 15 | Storage B | Unknown | – | 0 | – |
| V4 | 21 | Storage C | SATA | – | 28.57142857 | – |
| V5 | 00:00:02 | Storage A | SSD | – | 100 | – |
| V6 | 00:00:03 | Storage A | SSD | – | 100 | – |
| V7 | 25 | Storage D | SAS | – | 57.14285714 | – |
| V8 | 50 | Storage E | SAS | – | 57.14285714 | – |

FIG. 25

Coordinates table (resource augmentation) T32

| C320 Coordinate ID | C321 Coordinate name | C322 Virtual machine ID | C323 Volume ID | C324 Initial area ID | C325 Allocation area ID | C326 Coordinate status |
|---|---|---|---|---|---|---|
| C1 | Ca | H1 | V1 | A1 | A1 | Match |
| C2 | Cb | H2 | — | — | A1, A2 | — |
| C3 | Cc | H3 | V2 | A1 | A4 | No match |
| C4 | Cd | H4 | V3 | A2 | A4 | No match |
| C5 | Ce | H5 | — | — | A3, A4 | — |
| C6 | Cf | H6 | — | — | A3, A4 | — |
| C7 | Cg | H7 | V4 | A3 | A4 | No match |
| C8 | Ch | H8 | — | — | A3, A4 | — |
| C9 | Ci | H9 | V8 | A1 | A1 | Match |
| C10 | Cj | H10 | — | — | A1, A2 | — |
| C11 | Ck | H11 | — | — | A1, A2 | — |
| C12 | Cl | H12 | — | — | A1, A2 | — |
| C13 | Cm | — | V5 | — | A1, A3 | — |
| C14 | Cn | — | V6 | — | A1, A3 | — |
| C15 | Co | — | V7 | — | A1, A3 | — |

Coordinates table (completion of migration)

| C320 Coordinate ID | C321 Coordinate name | C322 Virtual machine ID | C323 Volume ID | C324 Initial area ID | C325 Allocation area ID | C326 Coordinate status |
|---|---|---|---|---|---|---|
| C1 | Ca | H1 | V1 | A1 | A1 | Match |
| C2 | Cb | H2 | — | — | A1, A2 | — |
| C3 | Cc | H10 | V5 | A1 | A1 | Match |
| C4 | Cd | H11 | V3 | A2 | A2 | Match |
| C5 | Ce | H5 | — | — | A3, A4 | — |
| C6 | Cf | H6 | V6 | A3 | A3, A4 | — |
| C7 | Cg | H7 | — | — | A3 | Match |
| C8 | Ch | H8 | V8 | A1 | A3, A4 | — |
| C9 | Ci | H9 | V7 | — | A1 | Match |
| C12 | Cl | H12 | — | — | A1, A2 | — |
| C15 | Co | — | — | — | A1, A3 | — |
| C16 | Cp | H3 | V2 | — | A3, A4 | — |
| C17 | Cq | H4 | — | — | A3, A4 | — |
| C18 | Cr | — | — | — | A2, A4 | — |
| C19 | Cs | — | V4 | — | A2, A4 | — |

FIG. 27

Virtual machine table + virtual machine performance table (completion of migration) T33, T35

| Virtual machine ID C330 (C350) | Virtual machine name C331 | Virtualization server name C332 | CPU (GHz) C351 | No. of processors C352 | Benchmark score C353 | Static Performance value C354 | Dynamic Performance value C355 |
|---|---|---|---|---|---|---|---|
| H1 | Host A | VServer A | 2.00 | 1 | — | 63.63636364 | — |
| H2 | Empty A | VServer A | 2.00 | 1 | — | 63.63636364 | — |
| H3 | Empty H | VServer B | 1.86 | 1 | — | 45.45454545 | — |
| H4 | Empty I | VServer B | 1.86 | 1 | — | 45.45454545 | — |
| H5 | Empty B | VServer B | 1.86 | 1 | — | 45.45454545 | — |
| H6 | Empty C | VServer B | 1.86 | 1 | — | 45.45454545 | — |
| H7 | Host D | VServer C | 1.6 | 1 | — | 0 | — |
| H8 | Empty D | VServer C | 1.6 | 1 | — | 0 | — |
| H9 | Host E | VServer D | 2.33 | 1 | — | 100 | — |
| H10 | Host B | VServer D | 2.33 | 1 | — | 100 | — |
| H11 | Host C | VServer D | 2.33 | 1 | — | 100 | — |
| H12 | Empty G | VServer D | 2.33 | 1 | — | 100 | — |

FIG. 28

| Virtual machine table + virtual machine performance table (post-setting change) T33, T35 |||||||||
|---|---|---|---|---|---|---|---|---|
| C330 (C350) | C331 | C332 | C351 | C352 | C353 | C354 | C355 |
| Virtual machine ID | Virtual machine name | Virtualization server name | CPU (GHz) | No. of processors | Benchmark score | Static Performance value | Dynamic Performance value |
| H1 | Host A | VServer A | 2.00 | 1 | 51 | 63.63636364 | 45.45454545 |
| H2 | Empty A | VServer A | 2.00 | 1 | — | 63.63636364 | 45.45454545 |
| H3 | Empty H | VServer B | 1.86 | 1 | — | 45.45454545 | 0 |
| H4 | Empty I | VServer B | 1.86 | 1 | — | 45.45454545 | 0 |
| H5 | Empty B | VServer B | 1.86 | 1 | — | 45.45454545 | 0 |
| H6 | Empty C | VServer B | 1.86 | 1 | — | 45.45454545 | 0 |
| H7 | Host D | VServer C | 1.6 | 1 | 53 | 0 | 63.63636364 |
| H8 | Empty D | VServer C | 1.6 | 1 | — | 0 | 63.63636364 |
| H9 | Host E | VServer D | 2.33 | 1 | 98 | 100 | 100 |
| H10 | Host B | VServer D | 2.33 | 1 | 96 | 90.90909091 | 90.90909091 |
| H11 | Host C | VServer D | 2.33 | 1 | 91 | 81.81818182 | 81.81818182 |
| H12 | Empty G | VServer D | 2.33 | 1 | — | 72.72727273 | 72.72727273 |

FIG. 29

Volume table + volume performance table (post-setting change) — T34, T36

| C340 (C360) | C341 | C342 | C361 | C362 | C363 | C364 |
|---|---|---|---|---|---|---|
| Volume ID | LDEV ID | Storage name | Drive type | IOPS | Static performance value | Dynamic performance value |
| V1 | 00:00:01 | Storage A | SSD | 290K | 100 | 85.71428571 |
| V2 | 00:0A:02 | Storage A | SATA | 80K | 28.57142857 | 14.28571429 |
| V3 | 15 | Storage B | Unknown | 50K | 0 | 0 |
| V4 | 21 | Storage C | SATA | 100K | 28.57142857 | 28.57142857 |
| V5 | 00:00:02 | Storage A | SSD | 300K | 100 | 100 |
| V6 | 00:00:03 | Storage A | SSD | 280K | 100 | 71.42857143 |
| V7 | 25 | Storage D | SAS | 150K | 57.14285714 | 57.14285714 |
| V8 | 50 | Storage E | SAS | 130K | 57.14285714 | 42.85714286 |

FIG. 30

Coordinates table (post-setting change) T32

| C320 Coordinate ID | C321 Coordinate name | C322 Virtual machine ID | C323 Volume ID | C324 Initial area ID | C325 Allocation area ID | C326 Coordinate status |
|---|---|---|---|---|---|---|
| C1 | Ca | H1 | V1 | A1 | A3 | No match |
| C2 | Cb | H2 | — | — | A3, A4 | — |
| C3 | Cc | H10 | V5 | A1 | A1 | Match |
| C4 | Cd | H11 | V3 | A2 | A2 | Match |
| C5 | Ce | H5 | — | — | A3, A4 | — |
| C6 | Cf | H6 | V6 | A3 | A1 | No match |
| C7 | Cg | H7 | — | — | A1, A2 | — |
| C8 | Ch | H8 | V8 | A1 | A2 | No match |
| C9 | Ci | H9 | — | — | A1, A2 | — |
| C12 | Cl | H12 | V7 | — | A1, A3 | — |
| C15 | Co | — | — | — | A3, A4 | — |
| C16 | Cp | H3 | — | — | A3, A4 | — |
| C17 | Cq | H4 | — | — | A2, A4 | — |
| C18 | Cr | — | V2 | — | A2, A4 | — |
| C19 | Cs | — | V4 | — | A2, A4 | — |

FIG. 31

Coordinates table (completion of migration after setting change) T32

| Coordinate ID C320 | Coordinate name C321 | Virtual machine ID C322 | Volume ID C323 | Initial area ID C324 | Allocation area ID C325 | Coordinate status C326 |
|---|---|---|---|---|---|---|
| C1 | Ca | H12 | V1 | A1 | A1 | Match |
| C2 | Cb | H2 | — | — | A3, A4 | — |
| C3 | Cc | H10 | V5 | A1 | A1 | Match |
| C4 | Cd | H11 | V3 | A2 | A2 | Match |
| C5 | Ce | H5 | — | — | A3, A4 | — |
| C6 | Cf | H6 | V6 | A3 | A3, A4 | Match |
| C7 | Cg | H3 | — | — | A3 | — |
| C8 | Ch | H8 | V7 | A1 | A1 | Match |
| C9 | Ci | H9 | — | — | A3, A4 | — |
| C17 | Cq | H4 | V2 | — | A2, A4 | — |
| C18 | Cr | — | V4 | — | A2, A4 | — |
| C19 | Cs | — | — | — | A3, A4 | — |
| C20 | Ct | H1 | V8 | — | A1, A2 | — |
| C21 | Cu | H7 | — | — | A1, A2 | — |
| C22 | Cv | — | — | — | A1, A3 | — |

FIG. 32

Virtual machine table + virtual machine performance table (completion of migration after setting change)  
C330 (C350) — T33, T35

| C331 Virtual machine ID | Virtual machine name | C332 Virtualization server name | C351 CPU (GHz) | C352 No. of processors | C353 Benchmark score | C354 Static performance value | C355 Dynamic Performance value |
|---|---|---|---|---|---|---|---|
| H1 | Empty J | VServer A | 2.00 | 1 | 51 | 63.63636364 | 45.45454545 |
| H2 | Empty A | VServer A | 2.00 | 1 | — | 63.63636364 | 45.45454545 |
| H3 | Host D | VServer B | 1.86 | 1 | — | 45.45454545 | 0 |
| H4 | Empty I | VServer B | 1.86 | 1 | — | 45.45454545 | 0 |
| H5 | Empty B | VServer B | 1.86 | 1 | — | 45.45454545 | 0 |
| H6 | Empty C | VServer B | 1.86 | 1 | — | 45.45454545 | 0 |
| H7 | Empty K | VServer C | 1.6 | 1 | 53 | 0 | 63.63636364 |
| H8 | Empty D | VServer C | 1.6 | 1 | — | 0 | 63.63636364 |
| H9 | Host E | VServer D | 2.33 | 1 | 98 | 100 | 100 |
| H10 | Host B | VServer D | 2.33 | 1 | 96 | 90.90909091 | 90.90909091 |
| H11 | Host C | VServer D | 2.33 | 1 | 91 | 81.81818182 | 81.81818182 |
| H12 | Host A | VServer D | 2.33 | 1 | — | 72.72727273 | 72.72727273 |

MANAGEMENT COMPUTER AND COMPUTER SYSTEM MANAGEMENT METHOD

TECHNICAL FIELD

The present invention relates to a management computer and a computer system management method.

BACKGROUND ART

In a computer system at a data center or the like, multiple work processes are executed by providing a large number of computers and a large number of storage apparatuses. When a computer system is initially built, the system administrator allocates a combination of a virtual machine and a logical volume to a work process in accordance with the type of work process. For example, a high-performance computer and a high-performance logical volume inside the computer system are allocated to a work process that requires high-speed processing. A low-performance computer and a low-performance logical volume inside the computer system are allocated to a work process for which low-speed processing is sufficient. This makes effective use of the computer system's resources.

Furthermore, a method for efficiently operating multiple virtual machines on multiple servers is known (Patent Literature 1).

CITATION LIST

Patent Literature

[PTL 1]
Japanese Patent Laid-open Application No. 2005-115653

SUMMARY OF INVENTION

Technical Problem

The prior art for operating multiple virtual machines among multiple servers is merely a technique for simply distributing a load among multiple servers, and does not enable a determination to be made as to whether or not a combination of resources of the computer system is being appropriately utilized. In addition, in the prior art, it is also not possible to provide multiple work processes having different performance requirements with combinations of resources that are suited to these work processes. Therefore, a combination of resources with higher than needed performance is allocated to a work process for which low-speed performance is sufficient, resulting in a problem in which it is not possible to provide a high-performance resource combination to a work process requiring high-speed processing.

With the foregoing in view, an object of the present invention is to provide a management computer and a computer system management method that makes it possible to automatically determine whether or not a combination of a virtual computer and a logical volume are being used appropriately. Another object of the present invention is to provide a management computer and a computer system management method that makes it possible to provide an appropriate combination of a virtual computer and a logical volume in accordance with the type of work process.

Solution to Problem

A management computer in accordance with the present invention is for managing a computer system, and the management computer includes: a communication interface for communicating with multiple computers comprising one or more virtual computers, and one or more storage apparatuses comprising multiple logical volumes; a storage device for storing a prescribed computer program; and a microprocessor for reading and executing the prescribed computer program from the storage device. The microprocessor executes the prescribed computer program to execute the following processes.

The microprocessor configures a coordinate plane, which comprises a first axis denoting a virtual computer performance value, which is a performance value that is determined relatively from among the virtual computers included in the computer system, and a second axis denoting a volume performance value, which is a performance value that is determined relatively from among the logical volumes included in the computer system, disposes multiple areas in the coordinate plane in accordance with a prescribed criterion, computes the virtual computer performance value with respect to the virtual computers, computes the volume performance value with respect to the logical volumes, determines to which area of the areas a pair of a virtual computer and a logical volume from among the virtual computers and the logical volumes belongs based on the virtual computer performance value computed with respect to the virtual computer comprising the pair and the volume performance value computed with respect to the logical volume comprising the pair, and stores the determined area as an initial area, respectively recomputes at a prescribed time the virtual computer performance value with respect to the virtual computer comprising the pair and the volume performance value with respect to the logical volume comprising the pair, redetermines to which area of the areas the pair belongs based on the recomputed virtual computer performance value and volume performance value, and stores the redetermined area as a latest area, determines whether or not the initial area and the latest area match, and outputs information to effect that there is no match in a case where the initial area and the latest area does not match.

The prescribed criterion may be configured in accordance with performance requirements for each type of work. The microprocessor, in a case where the initial area and the latest area do not match, may create a migration plan for matching the latest area to the initial area. The migration plan can comprise at least one of a virtual computer migration plan for migrating the virtual computer comprising the pair to another virtual computer from among the virtual computers, and a volume migration plan for migrating the logical volume comprising the pair to another logical volume from among the logical volumes.

The present invention may be understood as a computer program. This computer program can be distributed via either a communication medium or a recording medium.

BRIEF DESCRIPTION OF DRAWINGS

FIG. 6 is a table for managing a partition policy for creating areas.

FIG. 7 is a table for managing coordinates.

FIG. 8 is an illustrative drawing of a state in which a table for managing virtual machines has been integrated with a table for managing virtual machine performance.

FIG. 9 is an illustrative drawing of a state in which a table for managing logical volumes has been integrated with a table for managing logical volume performance.

FIG. 10 is a table for determining a performance ranking in accordance with a drive type.

FIG. 11 is an example of a screen for providing a user with system configuration coordinates and so forth.

FIG. 12 is an example of a setting screen.

FIG. 23 is a virtual machine table and a virtual machine performance table at the time when a resource (virtual machine) has been added.

FIG. 24 is a volume table and a volume performance table at the time when a resource (volume) has been added.

FIG. 25 is a coordinates table at the time when a resource has been added.

FIG. 26 is a coordinates table at the time when a resource migration has been completed.

FIG. 27 is a virtual machine table and a virtual machine performance table at the time when a resource migration has been completed.

FIG. 28 is a virtual machine table and a virtual machine performance table at the time when a performance index setting has been changed.

FIG. 29 is a volume table and a volume performance table at the time when a performance index setting has been changed.

FIG. 30 is a coordinates table at the time when a performance index setting has been changed.

FIG. 31 is a coordinates table at the time when a resource migration has been completed subsequent to changing a performance index setting.

FIG. 32 is a virtual machine table and a virtual machine performance table at the time when a resource migration has been completed subsequent to changing a performance index setting.

DESCRIPTION OF THE EMBODIMENT

The embodiment of the present invention will be explained below based on the drawings. In this embodiment, as will be described below, relative performance values are respectively computed with respect to multiple system configurations (virtual machine, logical volume, virtual machine-logical volume pair) of a computer system. In this embodiment, multiple system configurations are divided into multiple groups based on a relative performance value and a prescribed criterion. In the embodiment, these groups will be called performance areas. Furthermore, a relative performance value, for example, will be expressed as a percentile format.

A new system configuration may be added or an old system removed while operating the computer system. In addition, when operating the computer system, performance data related to each system configuration is accumulated. Consequently, a relative performance value is reviewed at a prescribed time. As a result of this review, a system configuration, which moves from a first group (initial area) to another group (latest area) may emerge.

In this embodiment, in a case where a pair system configuration (a virtual machine-logical volume pair) moves from the first group to the other group, this change is displayed. In this embodiment, the system configuration will be changed so that the pair system configuration can return to the first group. That is, at least a portion of the system configuration of the pair system configuration is made into another system configuration.

Figure 1:
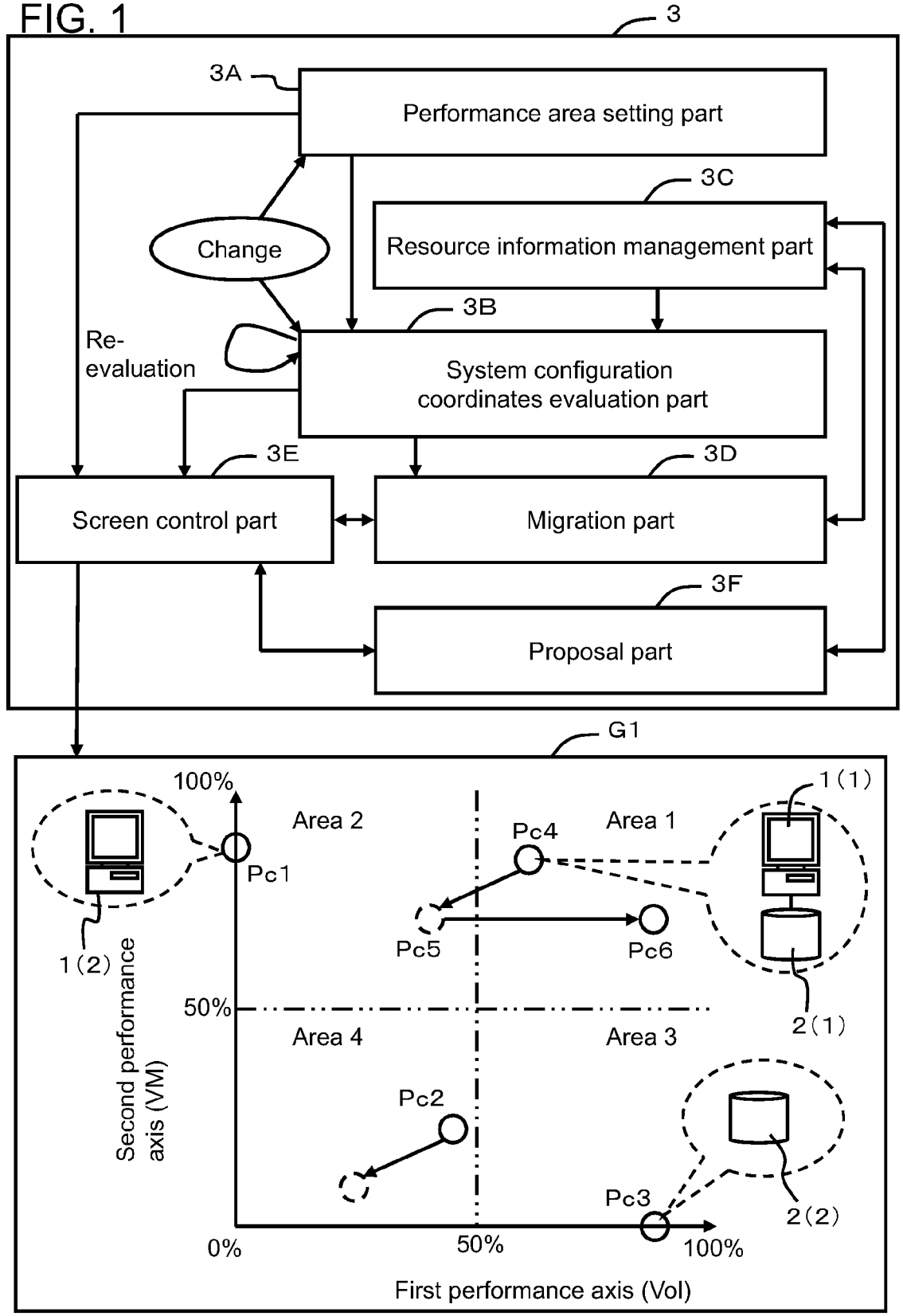
FIG. 1 is an illustrative drawing showing an overview of the embodiment.

FIG. 1 schematically shows the functions of a management server 3 for managing the computer system. The computer system, which is managed by the management server 3, comprises multiple virtual machines 1(1), 1(2) and multiple logical volumes 2(1), 2(2) as resources. The virtual machine 1 corresponds to the "virtual computer". The virtual machine Lisa computer, which is created virtually using the resources (a processor and a memory) of a physical computer as will be described below. In a case where no particular distinction is made, the virtual machines 1(1) and 1(2) will be called the virtual machine 1, and the logical volumes 2(1) and 2(2) will be called the logical volume 2.

The functions of the management server 3 will be explained. The management server 3, for example, comprises a performance area setting part 3A, a system configuration coordinates evaluation part 3B, a resource information management part 3C, a migration part 3D, a screen control part 3E, and a proposal part 3F.

The performance area setting part 3A is a function for configuring a performance area. For the sake of convenience, the performance area may be shortened to area. The performance area is created based on a system configuration performance value and a partition policy.

As shown in screen G1, a coordinate plane can be defined from a first performance axis (X axis) and a second performance axis (Y axis). The coordinate plane is partitioned into multiple areas 1 through 4 based on the partition policy. In FIG. 1, an example is given of a case in which the coordinate plane is partitioned into four areas, but the present invention is not limited to this, and the coordinate plane may be partitioned into two, three or five or more areas.

The areas are created so as to be able to satisfy the performance requirements of each type of work. For example, area 1, which uses a high-performance virtual machine and a high-performance logical volume, can be configured to be able to be used in a database configuration or the like in which high-speed processing is required. Area 2, which uses a high-performance virtual machine and a low-performance logical volume, for example, can be configured to be able to be used in scientific calculations and other such work processes. Area 3, which uses a low-performance virtual machine and a high-performance logical volume, for example, can be configured to be able to be used in backup processes and the like. Area 4, which uses a low-performance virtual machine and a low-performance logical volume, for example, can be configured to be able to be used in work processes related to electronic mail.

Furthermore, high and low performance are determined relatively. In addition, in a case where a high-performance resource has been added, even a resource, which was high performance in the past, becomes low performance. Also, the user can use a combination of resources in each area to freely configure the area according to what kind of work process is to be executed.

The first performance axis is the axis for performing a relative evaluation of a performance value (a volume performance value) based on a prescribed volume performance index. The volume performance index is for measuring the performance of the logical volume 2. The volume performance index, for example, can be divided into a static performance index and a dynamic performance index. As volume static performance indices, for example, there are the type of storage device comprising the logical volume, and the transfer rate and the rotation rate of the storage device. As the volume dynamic performance index, for example, there is IOPS (Input/Output Operations Per Second). The volume static performance index is equivalent to the "first volume performance index". The volume dynamic performance index is equivalent to the "second volume performance index".

The second performance axis is an axis for relatively evaluating a performance value (virtual machine performance value) based on a prescribed virtual machine performance index. The virtual machine performance index is for measuring the performance of the virtual machine 1. The virtual machine performance index is also divided into a static performance index and a dynamic performance index. As the virtual machine static performance indices, for example, there are the type of processor, the processor drive frequency, and the memory size. As the virtual machine dynamic performance index, for example, there is a benchmark score at the time when a performance measurement program has been executed. The virtual machine static performance index is equivalent to the "first virtual machine performance index". The virtual machine dynamic performance index is equivalent to the "second virtual machine performance index".

The system configuration coordinates evaluation part 3B is a function for evaluating the coordinates of a system configuration. The system configuration denotes the resources and combinations of resources included in the computer system. Specifically, the virtual machine 1, the logical volume 2, and the pair of the virtual machine 1 and the logical volume 2 are equivalent to system configurations. For the sake of convenience, the system configuration coordinates evaluation part 3B may be shortened to the evaluation part 3B. The evaluation part 3B evaluates the coordinates of the system configuration at a prescribed time. The prescribed time, for example, can be given as a case in which the configuration of the computer system has changed, or a case in which the definition of the coordinate plane has changed (a case where the performance index has changed).

The resource information management part 3C is a function for managing information related to each resource inside the computer system (for example, a virtual machine and a logical volume).

The migration part 3D is a function for migrating one part of a pair system configuration (this will also be called a pair configuration) to another system configuration. The migration part 3D comprises a function for switching the virtual machine 1 of a pair configuration to another virtual machine, and a function for switching the logical volume 2 of a pair configuration to another logical volume.

The migration part 3D can create and present multiple migration plans to the user, and can execute the migration plan selected by the user. Or, the migration part 3D can also automatically select any one migration plan from among multiple migration plans based on a prescribed selection criterion, and can execute this selected migration plan.

The screen control part 3E is a function for creating various types of screens comprising the screen G1 and controlling these respective screens. The screen G1 shows a state in which the coordinates of each system in the computer system have been mapped on a coordinate plane defined using the first performance axis and the second performance axis. Coordinate Pc1 is the location of a single virtual machine 1(2). A single virtual machine is a virtual machine for which an access path to the logical volume 2 has not been configured. Coordinate Pc3 is the location of a single logical volume 2(2). A single logical volume is a logical volume for which an access path to a virtual machine has not been configured.

Coordinates Pc2 and Pc4 are pair configuration coordinates. An explanation will be given using Pc4 as an example. The pair configuration coordinate Pc4 is determined by the performance value of the virtual machine 1(1) and the performance value of the logical volume 2(1) included in this pair configuration.

The performance value of the virtual machine 1 and the performance value of the logical volume 2, for example, are determined relatively using a percentile. That is, in a case where the virtual machine 1(1) was high performance at the time when the computer system was initially built, but thereafter a higher performance virtual machine 1(2) was added to the computer system, the status (the position in relation to the computer system) of the virtual machine 1(1) declines. Similarly, in a case where the logical volume 2(1) was high performance at the time when the computer system was initially built, but thereafter a higher performance logical volume 2(2) was added to the computer system, the status of the logical volume 2(1) declines.

Therefore, the pair configuration, which was at the coordinate Pc4 when the computer system was initially built, moves to coordinate Pc5 when a new virtual machine 1(2) and logical volume 2(2) are added to the computer system. In accordance with this, the area to which the pair configuration belongs changes from the initial area 1 to area 2.

In a case where the area to which the pair configuration currently belongs does not match the initial area, the migration part 3D creates a migration plan for solving this mismatch. The migration part 3D creates a migration plan such that the pair configuration coordinate is moved from the Pc5 inside area 2 to Pc6 inside area 1.

A point that needs to be noted here is that the migration plan is not a plan for returning the pair configuration to its original coordinate Pc4. The migration plan is created so that the latest area of the pair configuration matches the initial area. In a case where the pair configuration coordinate returns to the original area, the difference between the original coordinate Pc4 and the post-migration coordinate Pc6 is not considered.

In the example of FIG. 1, the logical volume comprising the pair configuration is switched from the initial logical volume 2(1) to the newly added logical volume 2(2). That is, a migration is performed from the logical volume 2(1) to the logical volume 2(2). The virtual machine 1(1) in the pair configuration is maintained as-is, and is not migrated. An access path is configured between the virtual machine 1(1)

and the logical volume 2(2). Only the logical volume 2 needs to be migrated in order to return the pair configuration coordinate to the original area (initial area). Consequently, the migration part 3D only performs a logical volume migration.

The proposal part 3F is a function for proposing to the system administrator byway of the screen G1 a virtual machine-logical volume pair suitable for the work process specified by the system. administrator. The proposal part 3F will be explained further below using a second example. The proposal part 3F is not necessary in the first example.

In a case where a new work process is to be executed on the computer system, the system administrator specifies the area on the screen G1 that is suited to this work process. The proposal part 3F retrieves and displays a virtual machine-logical volume pair that suits the specified work process.

Configuring this embodiment like this makes it possible to automatically determine whether or not the resource combinations in the computer system, which comprises multiple resources (system configurations), are being utilized appropriately, and to output the determination result.

In addition, in this embodiment, it is possible to provide a combination of resources suited to each type of work process having different performance requirements even in a case where the configuration of the computer system has changed. In particular, a combination of a virtual machine and a logical volume corresponding to the performance requirements of a work process can be allocated to the work process even in a case where the configuration has changed in a large-scale computer system comprising a large number of virtual machines 1 and a large number of logical volumes 2.

That is, in this embodiment, in a large-scale computer system where a configuration change occurs frequently, a resource suited to each work process can be allocated either automatically, semi-automatically, or manually in response to this configuration change. As a result of this, the system administrator can be spared the trouble of changing resource allocations, thereby enhancing usability. In addition, it is possible to make effective use of the computer system resources.

EXAMPLE 1

Figure 2:
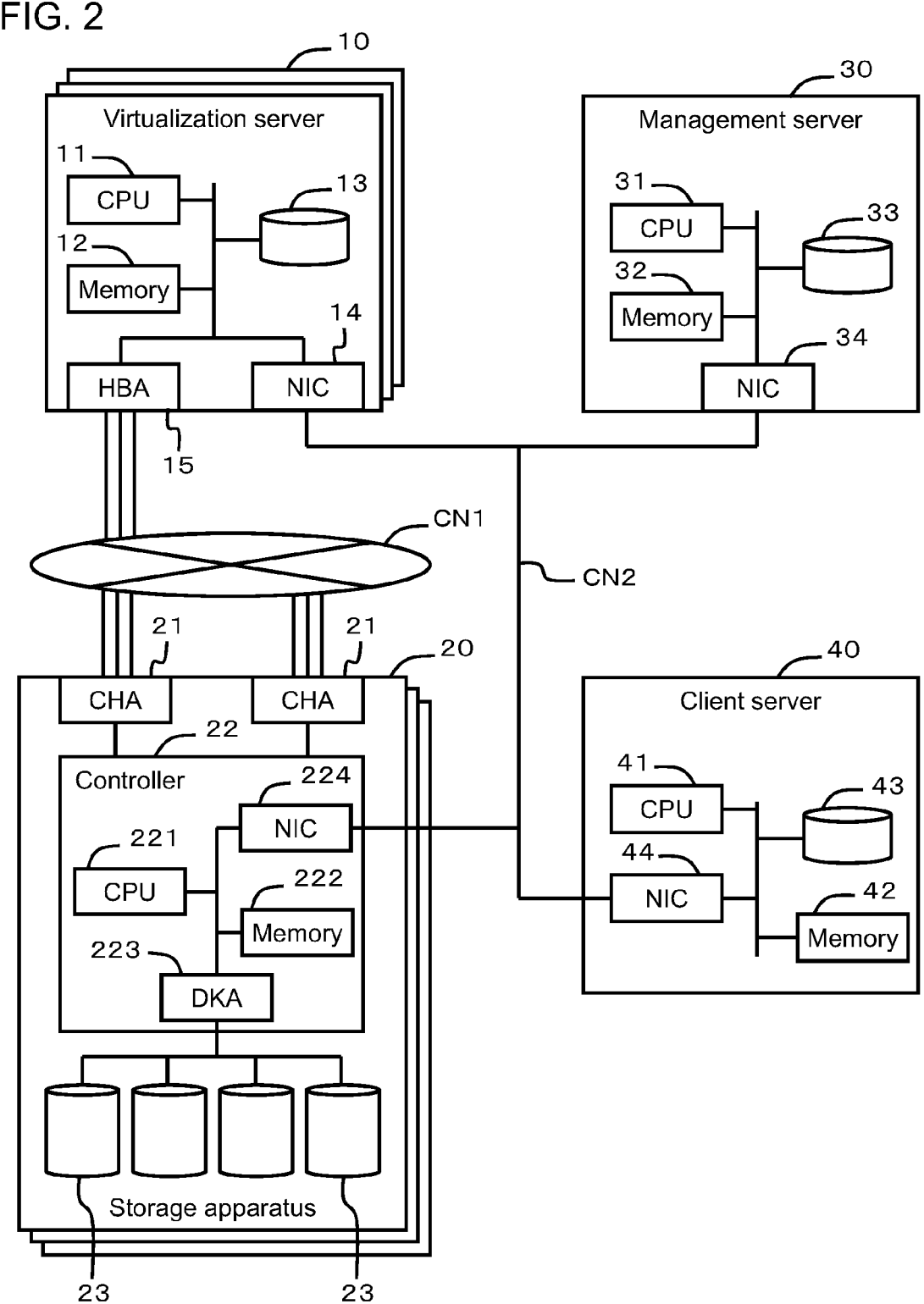
FIG. 2 is a block diagram of computer system hardware.

A first example will be explained by referring to FIGS. 2 through 32. FIG. 2 shows the hardware configuration of the computer system. The computer system, for example, comprises multiple virtualization servers 10, multiple storage apparatuses 20, and at least one management server 30. In addition, a client server 40 for operating the management server 30 may also be disposed in the computer system.

The virtualization server 10 is equivalent to the "computer". The virtualization server 10 corresponds to the computer 1 of FIG. 1. The virtualization server 10 is a computer that is able to run a virtual machine 100 (will be explained further below using FIG. 3)

The virtualization server 10, for example, comprises a microprocessor (hereinafter CPU) 11, a memory 12, an auxiliary storage device 13, a NIC (Network Interface Card) 14, and a HBA (Host Bus Adapter) 15. The memory 12 stores a computer programs and so forth for controlling virtualization. The CPU 11 is a physical CPU, and comprises multiple processor cores. One CPU 11 is shown in the drawing, but actually the virtualization server 10 can comprise multiple multi-core CPUs. Furthermore, in a case where the size of the memory 12 is sufficiently large, the auxiliary storage device 13 may be eliminated.

The virtualization server 10 communicates with the management server 30 via the NIC 14 and a management communication network CN2. The virtualization server 10 communicates with the storage apparatus 20 via the HBA 15 and a data input/output communication network CN1.

The data input/output communication network CN1, for example, is configured as an IP-SAN (Storage Area Network). The management communication network CN2, for example, is configured as a LAN (Local Area Network). The data input/output communication network CN1 and the management communication network CN2 may be consolidated into a single communication network.

The storage apparatus 20, for example, comprises multiple channel adapters (CHA in the drawing) 21, at least one controller 22, and multiple storage devices 23.

The channel adapter 21 is a communication control circuit for communicating with the virtualization server 10 via the data input/output communication network CN1. Each channel adapter 21 comprises multiple communication ports.

The controller 22 controls the operation of the storage apparatus 20. The controller 22, for example, comprises a CPU 221, a memory 222, a disk adapter (DKA in the drawing) 223, and a NIC 224. Multiple controllers 22 may be provided to give the storage apparatus 20 redundancy.

The memory 222, for example, stores a command processing program for interpreting and executing various types of commands issued from the server 10, and a RAID (Redundant Array of Independent Disks) control program.

The disk adapter 223 is a communication control circuit for communicating with the respective storage devices 23. The NIC 224 is a communication interface circuit for communicating with the management server 30 via the management communication network CN2.

Various devices capable of reading and writing data, such as a hard disk device, a semiconductor memory device, and an optical disk device, for example, can be used as the storage device 23.

In a case where a hard disk device is used as the storage device, for example, it is possible to use a FC (Fibre Channel) disk, a SCSI (Small Computer System Interface) disk, a SATA disk, a ATA (AT Attachment) disk, or a SAS (Serial Attached SCSI) disk.

In addition, devices such as a flash memory, a FeRAM (Ferroelectric Random Access Memory), a MRAM (Magnetoresistive Random Access Memory), an Ovonic Unified Memory, and a RRAM (Resistance RAM), for example, may also be used as the storage device. Different types of storage devices, like a flash memory and a hard disk drive, can also be intermixed inside the same storage apparatus. The storage structure of the storage apparatus 20 will be described further below using FIG. 3.

The management server 30 manages the respective virtualization servers 10 and the respective storage apparatuses 20 included in the computer system. The management server 30, for example, comprises a CPU 31, a memory 32, an auxiliary storage device 33, and a NIC 34. The computer program and so forth of the management server 30 will be described further below using FIG. 4. The management server 30 is not limited to comprising one computer, but rather may comprise multiple computers.

The client server 40 issues instructions to the management server 30 and fetches information from the management server 30. The client server 40, for example, comprises a CPU 41, a memory 42, an auxiliary storage device 43, and a NIC 44. The client server 40 is coupled to the management server 30 via the NIC 44 and the communication network CN2. Furthermore, the configuration may be such that communications with the management server 30 are carried out using an operating terminal, which is coupled to the management computer 30, instead of using the client server 40.

Figure 3:
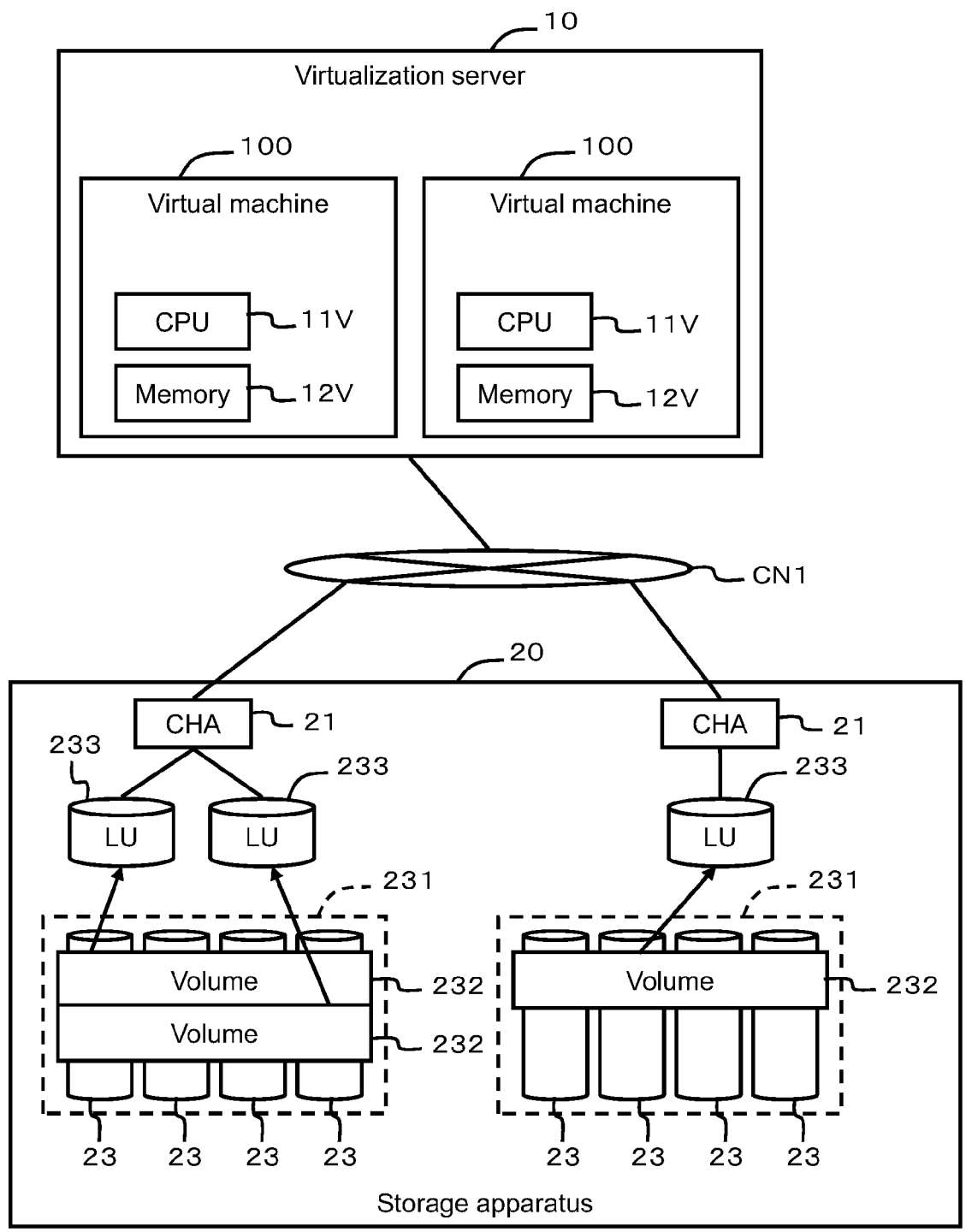
FIG. 3 is an illustrative drawing showing virtual machines and logical volumes.

FIG. 3 schematically shows virtual machines 100 and logical volumes 232. Multiple virtual machines 100 can be disposed in the virtualization server 10. A virtual processor 11V and a memory 12V can be obtained by virtualizing and partitioning the physical resources (CPU, memory) of the physical server 10. Each virtual machine 100 uses the virtual processor 11V and the memory 12V to independently operate the operating system and so forth.

Look at the storage apparatus 20. Physical storage areas each comprising multiple storage devices 23 can be consolidated into a single RAID group 231. A logical volume 232 is created by logically partitioning the storage area of the RAID group 231. The logical volume 232 is a logical storage area. A LUN (Logical Unit Number) is associated with the logical volume 232, and provided to each virtual machine 100 of the virtualization server 10 as a LU 233.

Figure 4:
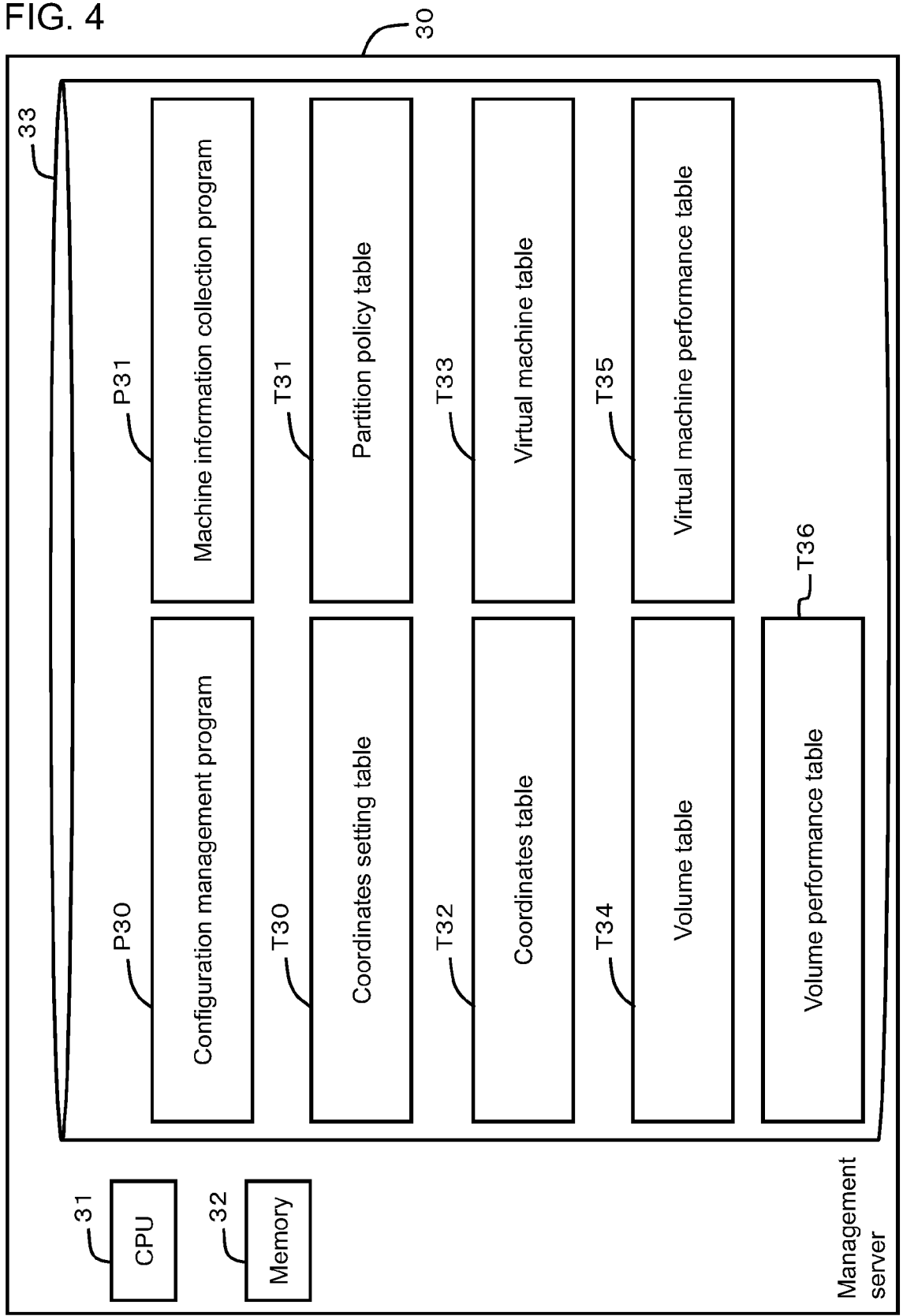
FIG. 4 is an illustrative drawing showing the storage contents of a management server.

FIG. 4 schematically shows the storage contents of the management server 30. Computer programs and management tables are stored in the auxiliary storage device 33 that serves as the "storage device". The computer programs, for example, include a configuration management program P30 and a machine information collection program P31. The management tables, for example, include a coordinates setting table T30, a partition policy table T31, a coordinates table T32, a virtual machine table T33, a volume table T34, a virtual machine performance table T35, and a volume performance table T36.

The configuration management program P30 manages the respective resources (system configuration) of the computer system. Details will be explained further below, but the configuration management program P30 relatively evaluates the performance values of the virtual machines 100 and the logical volumes 232, and performs classification and management based on the performance values. The configuration management program P30 executes a migration when the area to which a pair of the virtual machine 100 and the logical volume 232 belongs does not match the initial area. The machine information collection program P31 collects and manages information of the respective virtual machines 100.

The coordinates setting table T30 manages information for configuring a prescribed coordinate plane (system configuration coordinate plane). The partition policy table T31 manages information for creating multiple performance areas in the coordinate plane. The coordinates table T32 manages virtual machine 100 coordinates, logical volume 232 coordinates, and the coordinates of a system configuration comprising a pair of a virtual machine 100 and a logical volume 232. The virtual machine table T33 manages the respective virtual machines 100 registered in the configuration management program P30. The volume table T34 manages the respective logical volumes 232 registered in the configuration management program P30. The virtual machine performance table T35 manages the performance of the respective virtual machines 100 registered in the configuration management program P30. The volume performance table T36 manages the performance of the respective logical volumes 232 registered in the configuration management program P30.

Either a computer program or a management table other than the respective computer programs and respective management tables described above may be stored in the storage device 33. In a case where the memory size is sufficiently large, either all or a portion of the above-mentioned computer programs and management tables may be stored inside the memory 32 instead of in the auxiliary storage device 33. In addition, at least a portion of each of the above-mentioned management tables may be partitioned into multiple tables, or multiple management tables may be consolidated into a single table.

Figure 5:
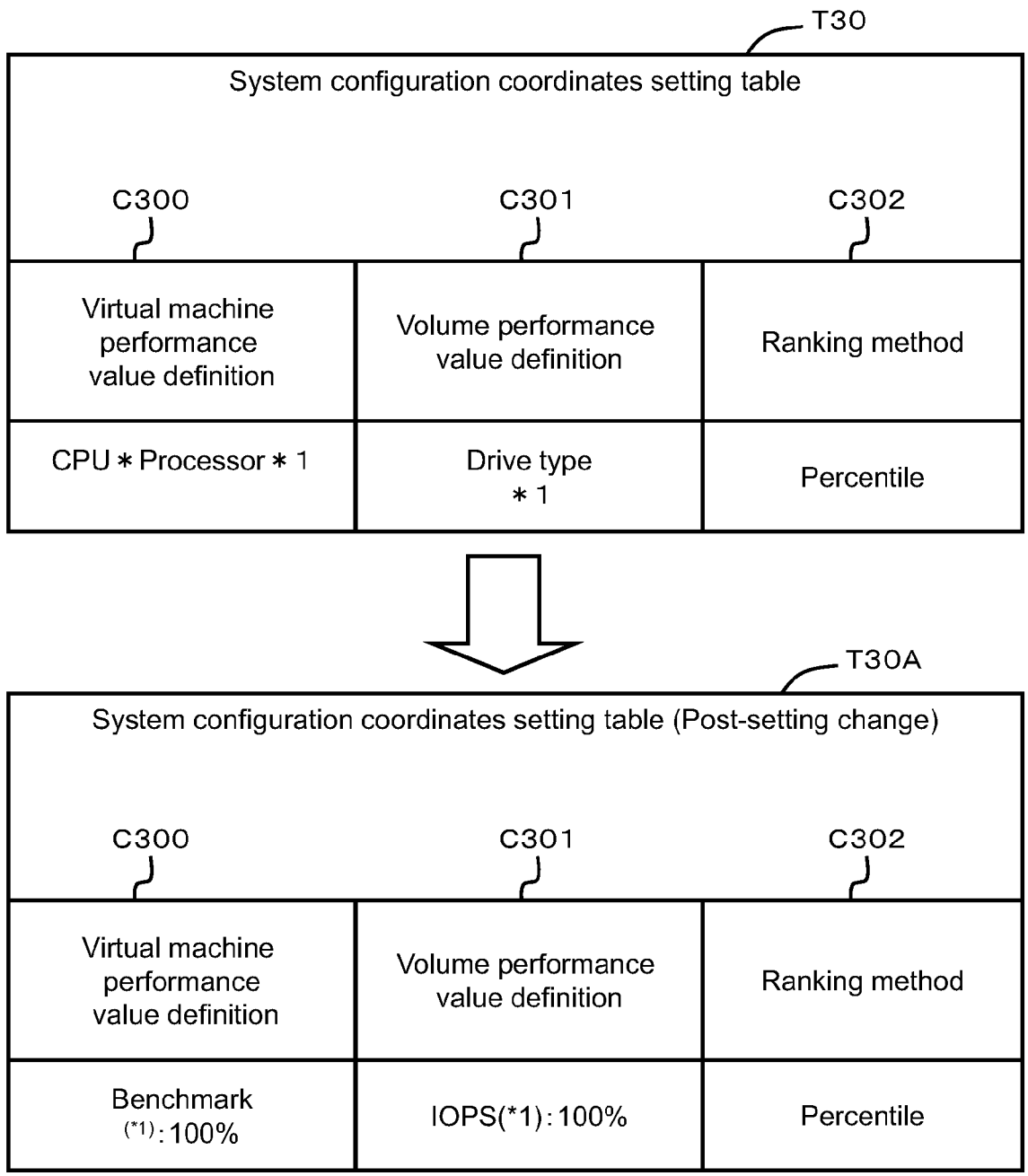
FIG. 5 is a table for configuring system configuration coordinates.

FIG. 5 shows an example of the configuration of the table T30 for configuring the coordinates of the system configuration. The coordinates setting table T30, for example, correspondingly manages types of evaluation-target performance data C300 and C301, and a performance data ranking method C302.

The virtual machine performance value definition C300 defines the performance value of the virtual machine 100. That is, types and weights of elements for evaluating the performance of the virtual machine 100 are configured in the virtual machine performance value definition C300. The volume performance value definition C301 defines the performance value of the logical volume 232. Types and weights of elements for evaluating the performance of the logical volume 232 are configured in the volume performance value definition C301.

A performance-based ranking method is configured in the ranking method C302. For example, a percentile or the like can be used as the ranking method. The ranking method may be a method other than a percentile in a case where it is possible to realize a relative position within the respective virtual machines and a relative position within the respective logical volumes.

The system administrator can change the information of the coordinates setting table T30 while the computer system is operating. The coordinates setting table T30A shown at the bottom of FIG. 5 denotes a post-setting change state. The virtual machine performance value definition C300 and the volume performance value definition C301 in the coordinates setting table T30A have been changed.

In the pre-change coordinates setting table T30, the performance of the virtual machine 100 is evaluated based on the number of physical CPUs and the number of virtual processors. The performance of the logical volume 232 is evaluated based on the drive type. That is, in the pre-change coordinates setting table T30, performance is evaluated based on static performance. When the computer system is initially built, resource performance is evaluated by focusing on static performance like catalog specifications, which do not change before and after operation.

By contrast, in the post-change coordinates setting table T30A, the performance of the virtual machine 100 is evaluated based on the result of a benchmark measurement program. The performance of the logical volume 232 is evaluated based on IOPS. In a case where the operation of the computer system has commenced and performance data has been accumulated, resource performance can be evaluated by focusing on dynamic performance, which changes in accordance with the situation at different times.

Switching the method for evaluating performance at computer system construction and subsequent to the computer system being operated makes it possible to properly manage the virtual machine 100 and the logical volume 232 by conforming more to the actual conditions. Furthermore, when changing the coordinates setting table T30, the coordinates of the respective resources (virtual machine, logical volume, and virtual machine-logical volume pair) are recomputed as described further below.

FIG. 6 shows an example of the configuration of the partition policy table T31. The partition policy table T31 of FIG. 6 shows the state at the time of the initial setting. The partition policy is information for partitioning and managing the coordinate plane defined by the coordinates setting table T30 in multiple performance areas (may be shortened to area).

The partition policy table T31, for example, comprises an area ID C310, an area name C311, a virtual machine performance lower limit C312, a virtual machine performance upper limit C313, a volume performance lower limit C314, and a volume performance upper limit C315.

The area ID C310 is information for identifying each area. The area name C311 is the name configured in each area, and can be freely configured by the system administrator. The system administrator, for example, can configure an area name in accordance with the type of the work process to be executed in the computer system.

For example, the area name "database configuration" is configured in an area, which the system administrator deems suited to database operations. The area name "scientific calculation" is configured in an area, which the system administrator deems suitable for scientific calculations. The area name "backup" is configured in an area, which the system administrator deems suitable for a backup process. In addition, for example, the area name "e-mail" is configured in an area, which the system administrator deems suitable for an electronic mail process. The examples are limited to "database configuration", "scientific calculation", "backup" and "e-mail", but other names besides these may be configured in the respective areas. A name denoting the performance characteristics of each area (for example, high-speed, high-performance area, low-speed, low-performance area, and so forth) may be used.

The virtual machine lower limit C312 denotes the lower limit of the performance value of the virtual machine belonging to this area. The virtual machine upper limit C313 denotes the upper limit of the performance value of the virtual machine belonging to this area. That is, only a virtual machine 100 comprising performance from the lower limit C312 to the upper limit C313 belongs to this area. The volume performance lower limit C314 denotes the lower limit of the performance value of the logical volume belonging to this area. The volume performance upper limit C315 denotes the upper limit of the performance value of the logical volume belonging to this area. Only a logical volume 232 comprising performance from the lower limit C314 to the upper limit C315 belongs to this area.

In this example, a performance value is evaluated relatively using a percentile. For example, in a case where 100 virtual machines are registered in the configuration management program P30, the virtual machines are arranged in order from the smallest performance value. A virtual machine with a performance value of 50% will be the $50^{th}$ virtual machine counting from the smallest performance value.

Therefore, when a virtual machine with higher performance is added to the computer system, the virtual machine, which was positioned at 50% prior to the addition, is relegated to a position of less than 50%. Alternatively, when a low-performance virtual machine is removed from the computer system, the virtual machine, which was positioned at 50% prior to the removal, moves to a position that is higher than 50%.

FIG. 7 shows an example of the configuration of the coordinates table T32. The coordinates table T32 of FIG. 7 denotes the state at the time of the initial setting. The coordinates table T32 is updated in a case where the coordinate setting method has been changed or a performance value has been evaluated.

The coordinates table T32, for example, comprises a coordinate ID C320, a coordinate name C321, a virtual machine ID C322, a volume ID C323, an initial area ID C324, an allocation area ID C325, and a coordinate status C326.

The coordinate ID C320 is information for identifying each coordinate. The coordinate name C321 is a system administrator-configurable name. The virtual machine ID C322 is information for identifying the virtual machine 100 associated with the coordinate. The volume ID C323 is information for identifying the logical volume 232 associated with the coordinate.

The initial area ID C324 is information for identifying the area to which the computed coordinate first belonged. The allocation area ID C325 is information for identifying the area to which the current coordinate belongs. The allocation area is equivalent to the "latest area". The coordinate status C326 is information denoting the status of the coordinate. The coordinate status can be "match", "no match" or "migration-in-progress". In a case where the initial area ID and the allocation area ID are a match, "match" is configured in the coordinate status C326. In a case where the initial area ID and the allocation area ID are not a match, "no match" is configured in the coordinate status C326. In a case where either a virtual machine 100 or a logical volume 232, which comprise a pair, is in the process of being migrated, "migration-in-progress" is configured in the coordinate status C326. In the case of the coordinate of either a virtual machine 100 or a logical volume 232, which does not comprise a pair, nothing is configured in the coordinate status C326.

FIG. 8 shows the virtual machine table T33 and the virtual machine performance table T35 at the time of the initial setting. FIG. 8 shows a state in which the virtual machine table T33 and the virtual machine performance table T35 have been integrated.

The virtual machine table T33 manages the respective virtual machines 100 registered in the configuration management program P30. The virtual machine table T33, for example, comprises a virtual machine ID C330, a virtual machine name C331, and a virtualization server name C332. The virtual machine ID C330 is information for identifying each virtual machine 100. The virtual machine name C331 is the name of a virtual machine displayed on the coordinate plane. The virtualization server name C332 is a name for identifying the virtualization server 10 in which either a virtual machine or an empty virtual machine is stored.

In this example, in addition to a virtual machine 100 that has actually been created, an empty virtual machine that does not actually exist is also managed as a resource. The empty virtual machine is a virtual machine configured in a surplus portion of the physical resources (CPU, memory) of the virtualization server 10. When an empty virtual machine is selected, a virtual machine 100 is created using the surplus physical resources. For example, an explanation will be given using as an example a case in which the virtualization server 10 comprises four virtual processors, and virtual machines 100 have been created using three of these processors. In this case, the one remaining virtual processor is registered in the configuration management program P30 as an empty virtual machine. This makes it possible to manage a virtual machine, which has not been created yet, but which can be created when the need arises as a resource in this example.

The virtual machine performance table T35 manages virtual machine performance information. The virtual machine performance table T35, for example, comprises a virtual machine ID C350, a number of CPU clocks C351, a number of processors C352, a benchmark score C353, a static performance value C354, and a dynamic performance value C355.

The virtual machine ID C350 is shared in common with the virtual machine ID C330 of the virtual machine table T33. The number of CPU clocks C351 is the number of clocks of the CPU 11 used by the virtual machine 100. The benchmark score C352 shows the measurement result of a benchmark measurement program. The static performance value C354 is a static performance value, which has been computed using the definition configured in the virtual machine performance value definition C300 of the coordinates setting table T30. The dynamic performance value C355 is a dynamic performance value, which has been computed using the definition configured in the virtual machine performance value definition C300.

FIG. 9 shows the volume table T34 and the volume performance table T36 at the time of the initial setting. FIG. 9 shows a state in which the volume table T34 and the volume performance table T36 have been integrated.

The volume table T34 manages the logical volumes 232 registered in the configuration management program P30. The volume table T34, for example, comprises a volume ID C340, a LDEV ID C341, and a storage name C342.

The volume ID C340 is information for identifying each logical volume 232, and is configured by the configuration management program P30. The LDEV ID C341 is identification information of a logical volume 232 displayed on the coordinate plane. The storage name C342 is a name for identifying the storage apparatus 20 in which the logical volume 232 is stored.

The volume performance table T36 manages the performance information of the logical volume 232. The volume performance table T36, for example, comprises a volume ID C360, a drive type C361, a IOPS C362, a static performance value C363, and a dynamic performance value C364.

The volume ID C360 is shared in common with the volume ID C340 of the volume table T34. The drive type C361 denotes the type of storage device 23 comprising the logical volume 232. The IOPS C362 is the IOPS of the logical volume 232. The static performance value C363 is a static performance value, which has been computed using the definition configured in the volume performance value definition C301 of the coordinates setting table T30. Similarly, the dynamic performance value C364 is a dynamic performance value, which has been computed in accordance with the definition of the volume performance value definition C301. Furthermore, a disk rotation rate, transfer rate, and so forth may be managed by the volume performance table T36 either instead of or in addition to the drive type.

FIG. 10 is a table T360 for ranking performance in accordance with the drive type. The ranking table T360 correspondingly manages a drive type C3600 and a performance ranking C3601.

For example, four types, i.e., SSD (a flash memory device) FC/SAS, SATA, and Unknown are shown in FIG. 10 as the drive type C3600. The SSD performance ranking is configured the highest. The FC/SAS performance ranking is configured the second highest. The SATA performance ranking is configured the third highest. The performance ranking of the unknown storage device is configured the lowest at fourth place.

FIG. 11 is an example of the screen G10, which displays the coordinates of the system configuration (resources and resource pairs). The coordinate display screen G10, for example, comprises a coordinate display part GP11 shown on the left side of FIG. 11, a summary display part GP12 shown in the upper right of FIG. 11, and a management information display part GP13 shown in the lower right of FIG. 11.

The coordinate display part GP11 displays the coordinate of each system configuration on the coordinate plane created based on information registered in the coordinates setting table T30. The coordinate plane, for example, is partitioned into four areas. The black dots denote the coordinates of pair configurations. The white circles denote the coordinates of single system configurations. In the drawing, virtual machine is abbreviated as "VM", and logical volume is abbreviated as "Vol". For convenience sake, the IDs of the areas in the coordinate plane are denoted using reference signs 1 through 4. In the summary and so forth, the IDs of the respective areas are denoted using reference signs A1 through A4.

The summary display part G12 shows an overview of the coordinate plane displayed in GP11. In the summary display part GP12, for example, a virtual machine performance definition, a volume performance definition, a ranking method (these three are the contents of the coordinates setting table T30), a number of areas, a number of virtual machines, a number of volumes, and a number of pairs are displayed. The number of pairs is displayed for each coordinate status. That is, the number of pairs for which the initial area and the allocation area are a match, the number of pairs for which the initial area and the allocation area are not a match, and the number of pairs in the process of being migrated are displayed.

The management information display part GP13, for example, comprises a tab for displaying the contents of the partition policy table T31, and a tab for displaying the contents of the coordinates table T32. In FIG. 11, the partition policy is being displayed.

The system administrator issues an instruction to the management server 30 to display the coordinate display screen G10 on the client server 40. The system administrator can readily confirm the current state of the computer system by looking at the coordinate display screen G10.

FIG. 12 is a creation screen G20 for creating the plane showing the coordinates of the system configurations. The creation screen G20, for example, comprises a system configuration coordinates plan GP21, a basic settings part GP22, and a partition policy setting part GP23.

The plan GP21 displays a plan for how the coordinate plane will be configured. FIG. 12 shows a state in which the second area has been configured. Information (the contents of the coordinates setting table T30) for configuring the coordinate plane is configured in the basic settings part GP22. A partition policy (the contents of the partition policy table T31) for creating the areas is configured in the partition policy setting part GP23.

The system administrator issues an instruction via the client server 40 to the management server 30 to display the creation screen G20 on the client server 40. The system. administrator defines the coordinate plane and configures multiple areas via the creation screen G20. The coordinate setting table T30 and the partition policy table T31 are created in accordance with this work.

The operation of the management server 30 will be explained by referring to FIGS. 13 through 18. The respective processes described below are realized by the microprocessor 31 reading and executing the configuration management program P30. Therefore, the doer of the action in the respective processes hereinbelow may be the configuration management program P30 or the microprocessor. Or, an explanation can also be given having the management server as the doer of the action in the respective processes hereinbelow. In this example, the explanation will be given using the management server as the doer of the action. Furthermore, a step will be abbreviated as "S".

Figure 13:
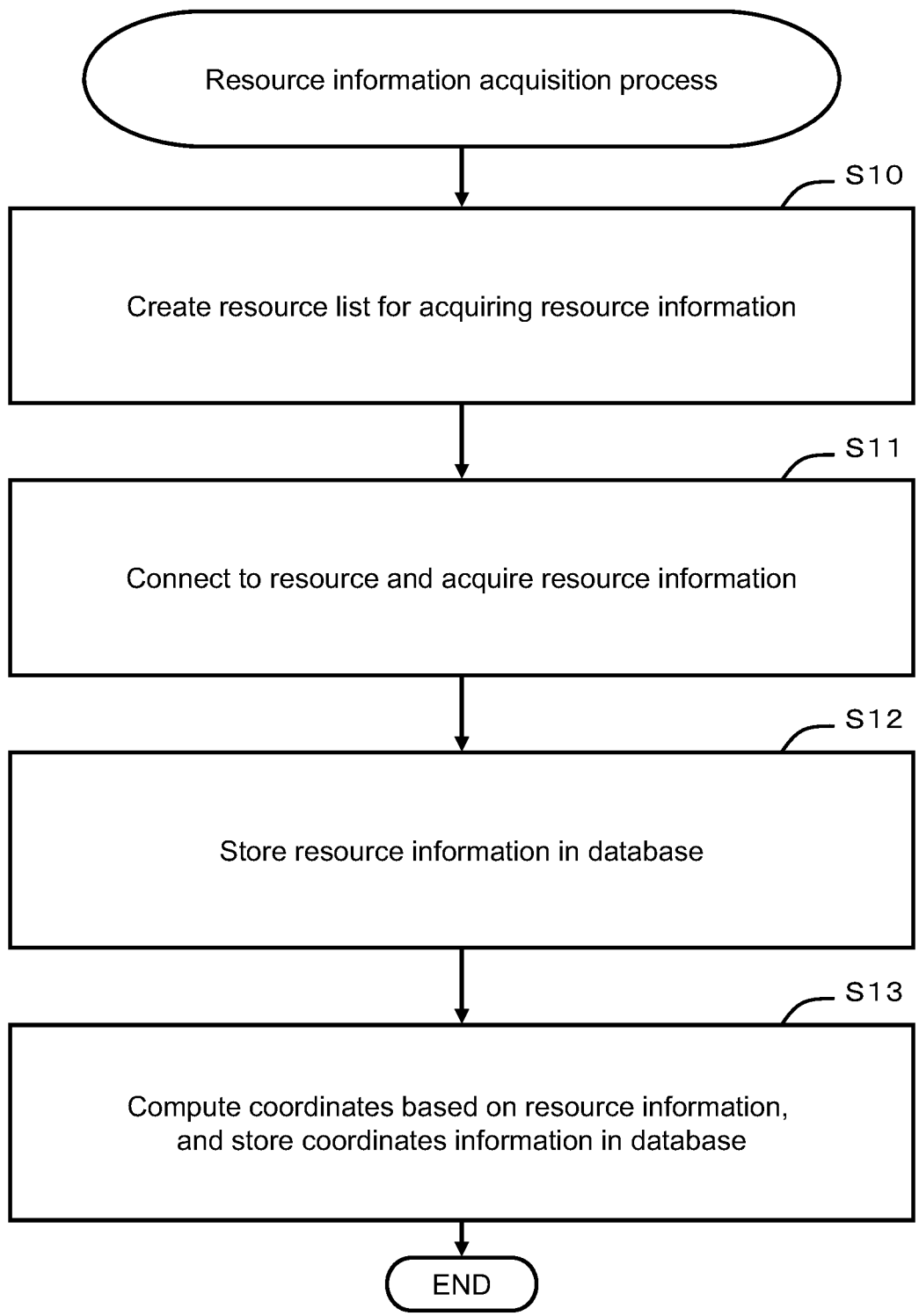
FIG. 13 is a flowchart of processing for acquiring resource information.

FIG. 13 is a flowchart showing the processing for acquiring resource information. The management server 30 (specifically, the configuration management program P30 of the management server 30) creates a list of resources for which resource information is to be acquired (S10). In a case where a resource is added to the computer system, the management server 30 creates the list based on resource addition information inputted by the user. In all other cases, the management server 30 creates the list based on registered resource information.

The management server 30 connects to each resource cited in the list and acquires the resource information (S11). The management server 30 stores the acquired resource information in a prescribed management table (displayed as DB in the drawing) (S12).

In the case of the virtual machine 100, the resource information may include a virtual machine name, a virtualization server name, a number of CPU clocks, and a number of processors. The virtual machine name and the virtualization server name are stored in the virtual machine table T33. The number of CPU clocks and the number of processors allocated to the virtual machine 100 are stored in the virtual machine performance table T35.

The virtual machine name and the virtual machine ID are automatically configured so that the configuration management program P30 becomes unique inside the computer system. The virtual machine name, for example, can be created by adding a serial number to the virtualization server name. In a case where the virtual machine ID has already been registered, the information is overwritten.

In the case of a logical volume 232, the resource information may include a LDEV ID, a storage name, and a drive type. The LDEV ID and the storage name are stored in the volume table T34. The drive type is stored in the volume performance table T36. The volume ID is automatically configured by the configuration management program P30. In a case where the volume ID has already been registered, the information is overwritten.

The management server 30 computes the system configuration coordinates based on the resource information, and stores the computed coordinates in the coordinates table T32 (S13). Specifically, the configuration management program. P30 of the management server 30 uses the resource information to create an entry in the coordinates table T32, and registers either the virtual machine ID or the volume ID in this entry. In the case of a resource that constitutes a pair, the resource ID is added to the same entry.

The specifics of the processing of FIG. 13 will be explained by giving the virtual machine as an example.
(1) The system administrator inputs the virtualization server 10 IP address, and a username and a password.
(2) The program (the configuration management program P30 and/or the machine information collection program P31) temporarily store the inputted IP address in memory.
(3) The program attempts to connect to the virtualization server using the inputted information.
(4) The program, after confirming that a proper connection was possible, acquires the virtualization server name, the host name of the virtual machine, and the virtual machine performance. The program stores this information in the virtual machine table together with the IP address.
(5) When storage in the database is complete, the program destroys the information that was stored temporarily.
(6) In accordance with the above procedure, the virtual machine name and so forth are displayed on the GUI (Graphical User Interface) the next time. For example, in a case where the system administrator wishes to acquire the latest performance information on the virtual machine, the system administrator uses the IP address stored in the database to connect to the virtual machine.

Figure 14:
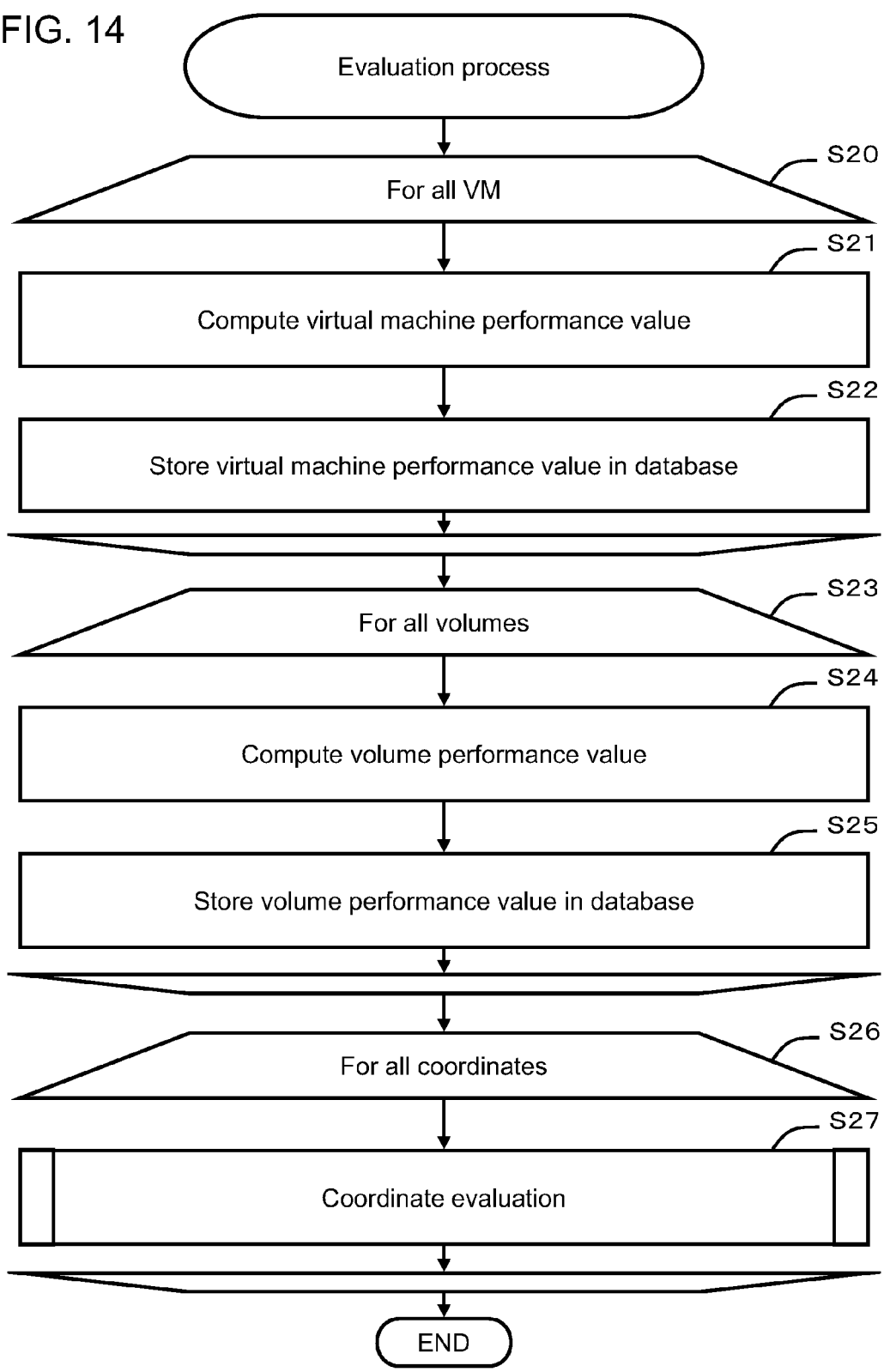
FIG. 14 is a flowchart of an evaluation process.

FIG. 14 is a flowchart showing the process for evaluating a resource. The management server 30 (the configuration management program P30 of the management server 30) computes the virtual machine performance values (S21) with respect to all the virtual machines 100 under management (S20).

The performance value is computed in accordance with the contents configured in the virtual machine performance value definition C300 of the coordinates setting table T30. In a case where the static performance value has been defined, the static performance value of the virtual machine 100 is computed. In a case where the dynamic performance value has been defined, the dynamic performance value is computed. The management server 30 stores the computed performance value in the virtual machine performance table T35 (S22).

The management server 30 computes the performance value of the logical volume (S24) for all of the logical volumes 232 under management (S23). The management server 30 stores the computed performance value in the volume performance table T36 (S25). The same as was described in S21, the management server 30 computes the volume performance value in accordance with the contents configured in the volume performance value definition C301 of the coordinates setting table T30.

The management server 30 evaluates (S27) all of the coordinates under management (S26). Coordinate evaluation will be explained using FIG. 15.

Figure 15:
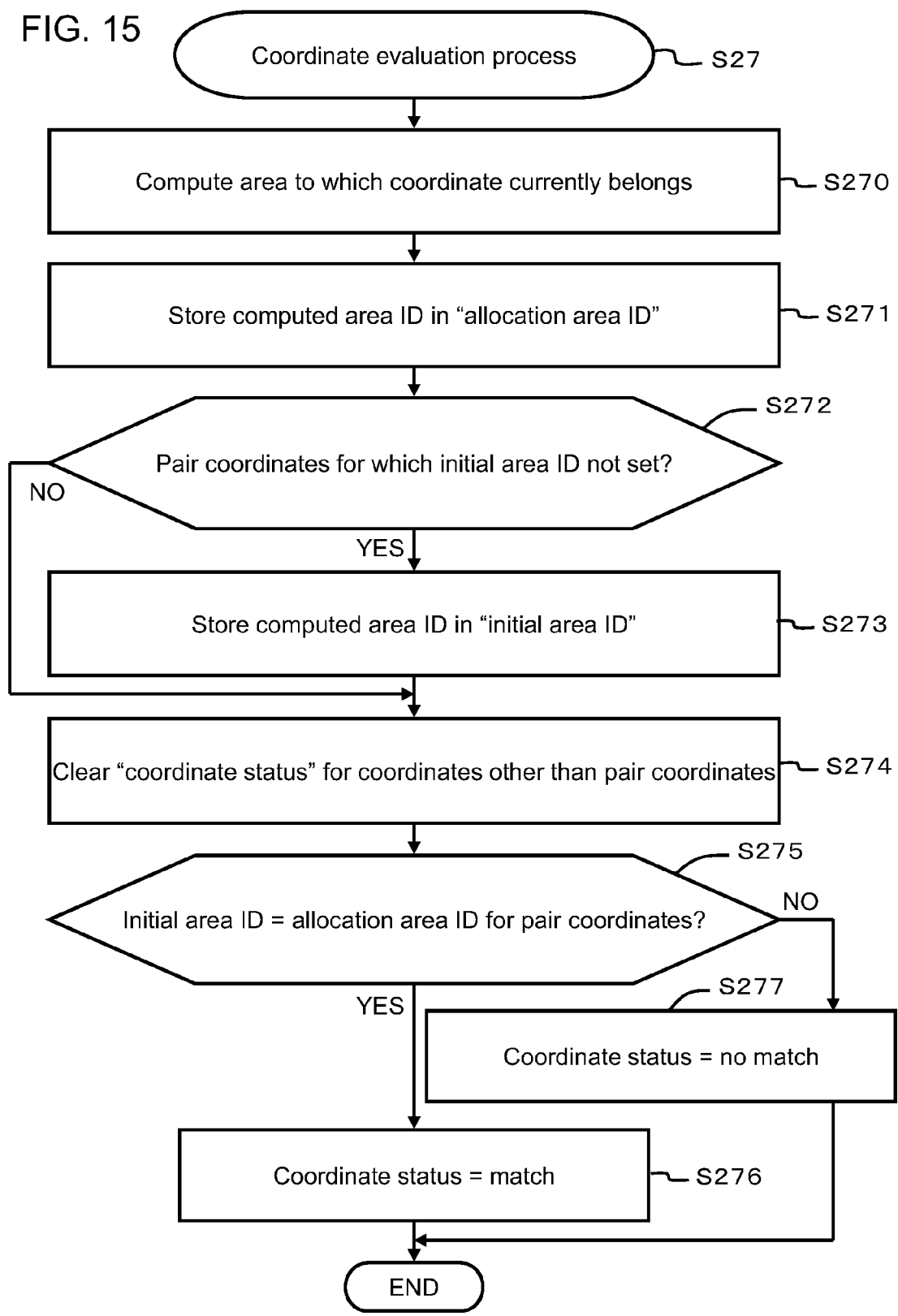
FIG. 15 is a flowchart of processing for evaluating coordinates.

FIG. 15 is a flowchart showing the details of the processing (S27) for evaluating a coordinate. The management server 30 (the configuration management program P30 of the management server 30) computes the ID of the area to which the system configuration coordinate belongs based on the performance values computed in S21 and S24 and the partition policy (S270). The management server 30 stores the computed area ID in the allocation area ID C325 of the coordinates table T32 (S271).

The management server 30 determines whether or not there is a pair configuration coordinate (a pair coordinate) for which the initial area ID has not been configured (S272). In a case where there is a pair coordinate for which the initial area ID has not been configured (S272: YES), the management server 30 stores the area ID computed in S270 in the initial area ID C324 of the coordinates table T32 (S273). In a case where a pair coordinate for which the initial area ID has not been configured does not exist (S272: NO), the management server 30 skips S273.

The management server 30 configures the coordinate status C326 entries other than that for the pair coordinate of the coordinate status C326 of the coordinates table T32 to null ("—" in the drawing) (S274). The management server 30 determines whether or not the initial area ID and the allocation area ID are a match with respect to the pair coordinate (S275). In a case where the initial area ID and the allocation area ID of the pair coordinate match (S275: YES), the management server 30 configures "match" in the coordinate status C326 of the coordinates table T32 (S276). In a case where the initial area ID and the allocation area ID of the pair coordinate do not match (S275: NO), the management server 30 configures "no match" in the coordinate status C326 (S277).

Figure 16:
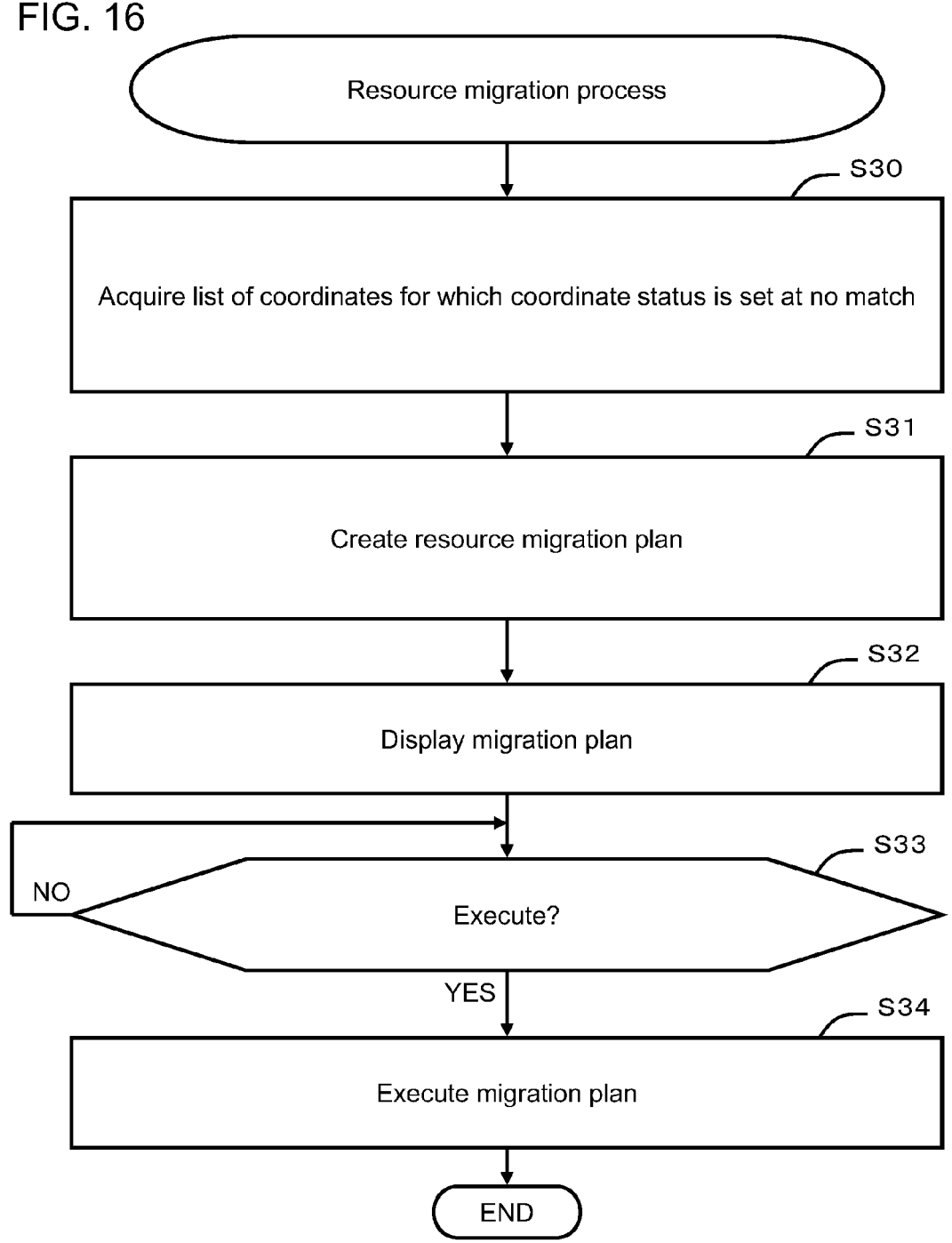
FIG. 16 is a flowchart of processing for migrating a resource.

FIG. 16 is a flowchart showing the process for migrating a resource. The management server 30 (the configuration management program P30 of the management server 30) acquires a list of pair coordinates for which "no match" has been configured in the coordinate status C326 of the coordinates table T32 (S30).

The management server 30 creates at least one or more migration plans (S31). The management server 30 outputs the migration plan(s) to the GUI (S32). The system administrator can select any one of the presented migration plans and instruct execution (S33: YES). The management server 30 executes the migration plan by issuing an instruction to the virtualization server 10 and/or the storage apparatus 20 based on the migration plan (S34).

Furthermore, instead of a configuration in which the system administrator manually selects a migration plan from among candidate migration plans, the configuration may be such that the management server 30 makes an automatic selection in accordance with a prescribed selection criterion.

There are multiple methods for creating a migration plan. For example, the management server 30 can create a migration plan based on a preconfigured priority. For example, priorities are configured for unused logical volumes, and a migration plan is created so that these unused logical volumes are used in descending order from the one having the highest priority. Similarly, priorities are configured for the empty virtual machines, and a migration plan is created so that these empty virtual machines are used in descending order from the one having the highest priority.

As another method, the management server 30 can also create a migration plan so as to minimize suspension of the work process. For example, in a case where virtual machine performance is to be raised, a method for migrating a higher performance virtual machine, and a method for increasing the number of virtual processors allocated to a virtual machine are conceivable.

In the case of the former, a migration from a migration-source virtual machine to a migration-destination virtual machine is completed by simply sending the required data from the migration-source virtual machine to the migration-destination virtual machine beforehand, booting the migration-destination virtual machine and suspending the migration-source virtual machine. The migration is completed without suspending the work process being executed by this virtual machine.

In the case of the latter, a virtual machine is suspended temporarily, and a virtual processor is added to this virtual machine. Therefore, work processing is halted. Therefore, the management server 30 selects a migration between virtual machines from the standpoint of not suspending work process operations.

As yet another method, the management server 30 can also create a migration plan so as to maximize the number of pair coordinates for which the initial area ID and the allocation area ID match. This method will be explained by referring to FIG. 17.

Figure 17:
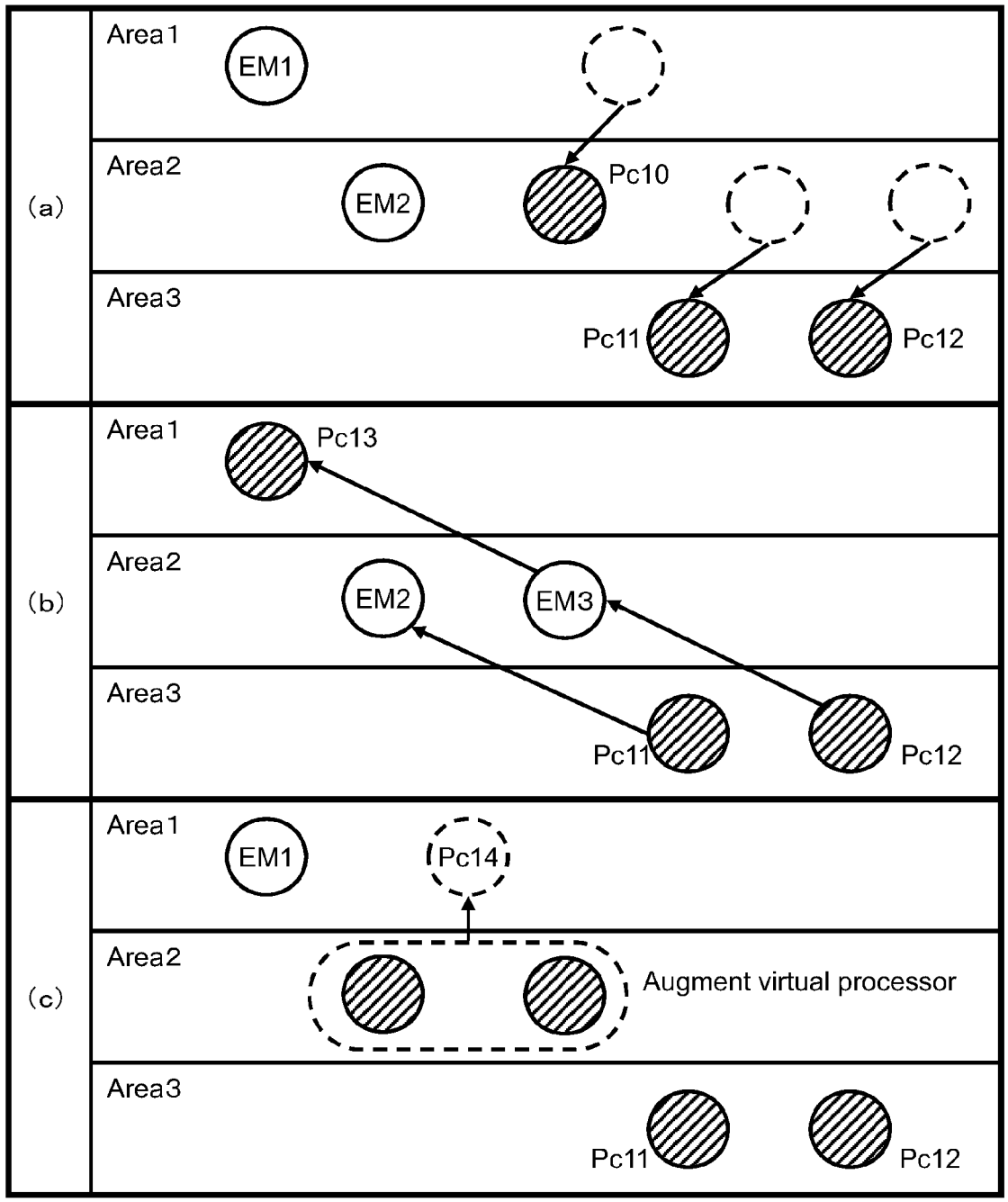
FIG. 17 is an illustrative drawing showing how to migrate a resource so as to increase the matching pairs in an area.

FIG. 17 is an illustrative drawing showing that results will differ in accordance with the order in which the migration steps are executed. For convenience of explanation, a case where virtual machine performance is to be raised in a state in which three areas have been created will be explained.

FIG. 17(a) shows a pre-migration state. A single empty virtual machine EM1 exists in area 1. An empty virtual machine EM2 and a pair coordinate Pc10 exist in area 2. It will be supposed that the pair coordinate Pc10 originally belonged to area 1. A pair coordinate Pc11 and a pair coordinate Pc12 exist in area 3. It will be supposed that the respective pair coordinates Pc11 and Pc12 originally belonged to area 2.

FIG. 17(b) shows a first migration plan. In the first migration plan, first of all, a migration takes place from the virtual machine of coordinate Pc10 in area 2 to the empty virtual machine EM1 of area 1. The post-migration coordinate is shown as Pc13. When the migration from Pc10 to Pc13 takes place, a new empty virtual machine EM3 comes into existence in area 2. Consequently, the virtual machines of the respective coordinates Pc11 and Pc12 of area 3 migrate to the empty virtual machines EM2 and EM3 of area 2. As a result of this, in the first migration plan, the virtual machines of the three coordinates Pc10, Pc11 and Pc12 each return to their original areas (initial areas).

FIG. 17(c) shows a second migration plan. In the second migration plan, a virtual processor corresponding to the empty virtual machine EM2 of area 2 is added to the virtual machine of coordinate Pc10 to increase the performance of the virtual machine. In this case, the empty virtual machine EM2 and the virtual machine of the coordinate Pc10 must reside in the same virtualization server 10.

Adding the virtual processor to the virtual machine of coordinate Pc10 causes the coordinate Pc10 virtual machine to migrate to coordinate Pc14 inside area 1. The virtual machines of the respective coordinates Pc11 and Pc12 of area 3 are not able to return to area 2. This is because a usable empty virtual machine does not exist in area 2. Therefore, in the second migration plan, only one of the virtual machines is able to return to its original area. Furthermore, because the virtual processor is added to the virtual machine in the second migration plan, work processing is halted temporarily.

As shown in FIG. 17, the management server 30 can select, from among multiple migration plans (migration plan candidates), a migration plan for increasing the number of pair coordinates for which the initial area ID and the allocation area ID are a match.

Figure 18:
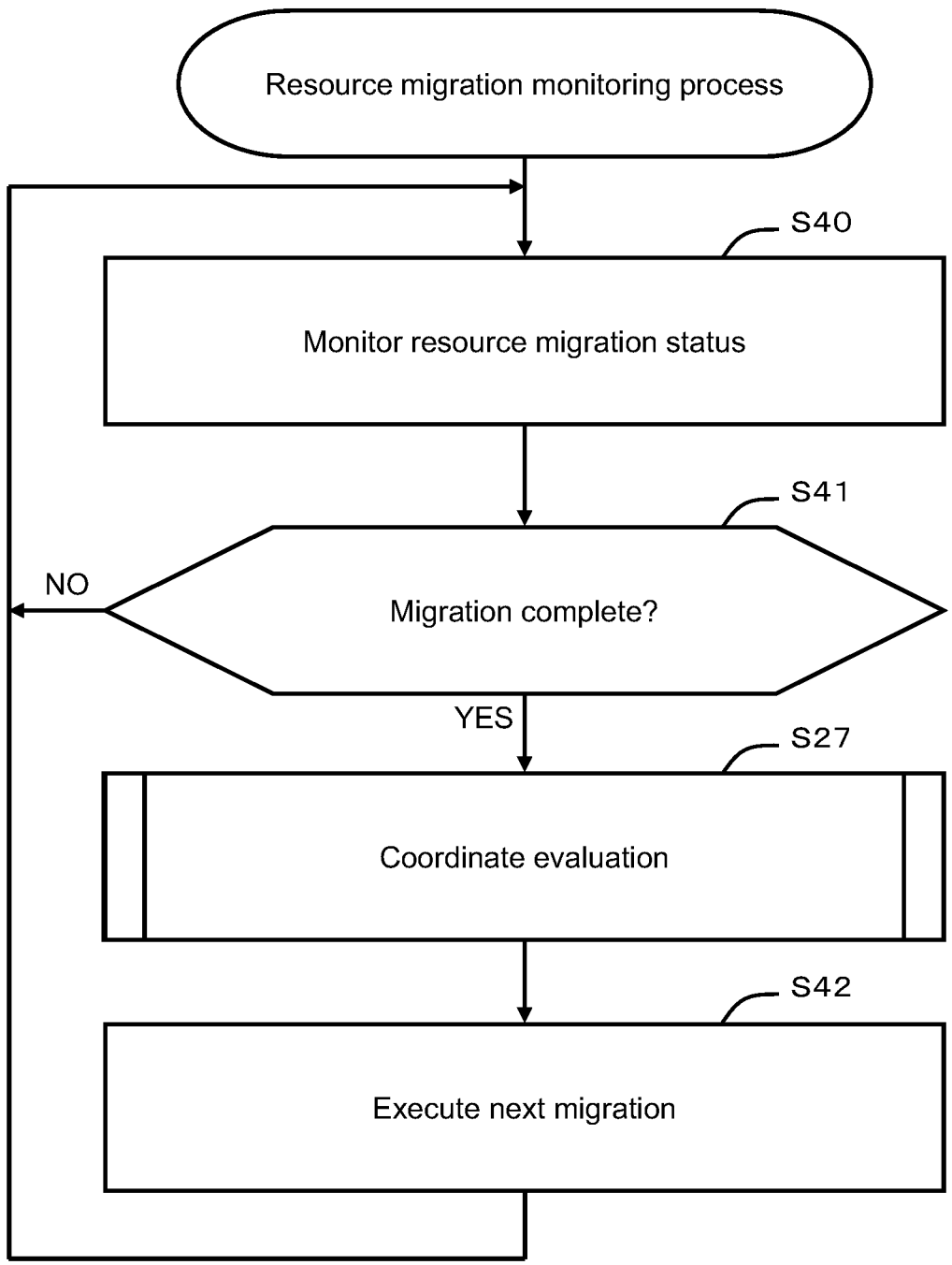
FIG. 18 is a flowchart of processing for monitoring a resource migration.

FIG. 18 is a flowchart showing the process for monitoring the migration plan. The management server 30 (the configuration management program P30 of the management server 30) monitors the migration status of a resource (S40) to determine whether or not the migration has been completed (S41).

In a case in which the migration has been completed (S41: YES), the management server 30 executes the coordinate evaluation process (S27) described using FIG. 15. In addition, the management server 30 executes the next migration included in the migration plan (S42). In this way, the management server 30 executes multiple migration steps included in the migration plan in a prescribed order.

Furthermore, it was explained that the management server 30 automatically creates a migration plan in a case where a pair coordinate for which the initial area ID and the allocation area ID do not match is detected. Instead of this, the configuration may also be such that the management server 30 simply notifies the system administrator of the existence of a pair coordinate for which the initial area ID and the allocation area ID do not match. However, in this case, the system administrator must create the migration plan and manually execute this migration plan.

Consequently, the configuration may also be such that the management server 30 does not only notify the system administrator of the existence of a pair coordinate for which the initial area ID and the allocation area ID do not match, but also presents the system administrator with a migration plan for solving this mismatch. In this case, the system administrator manually executes the migration plan.

Figure 19:
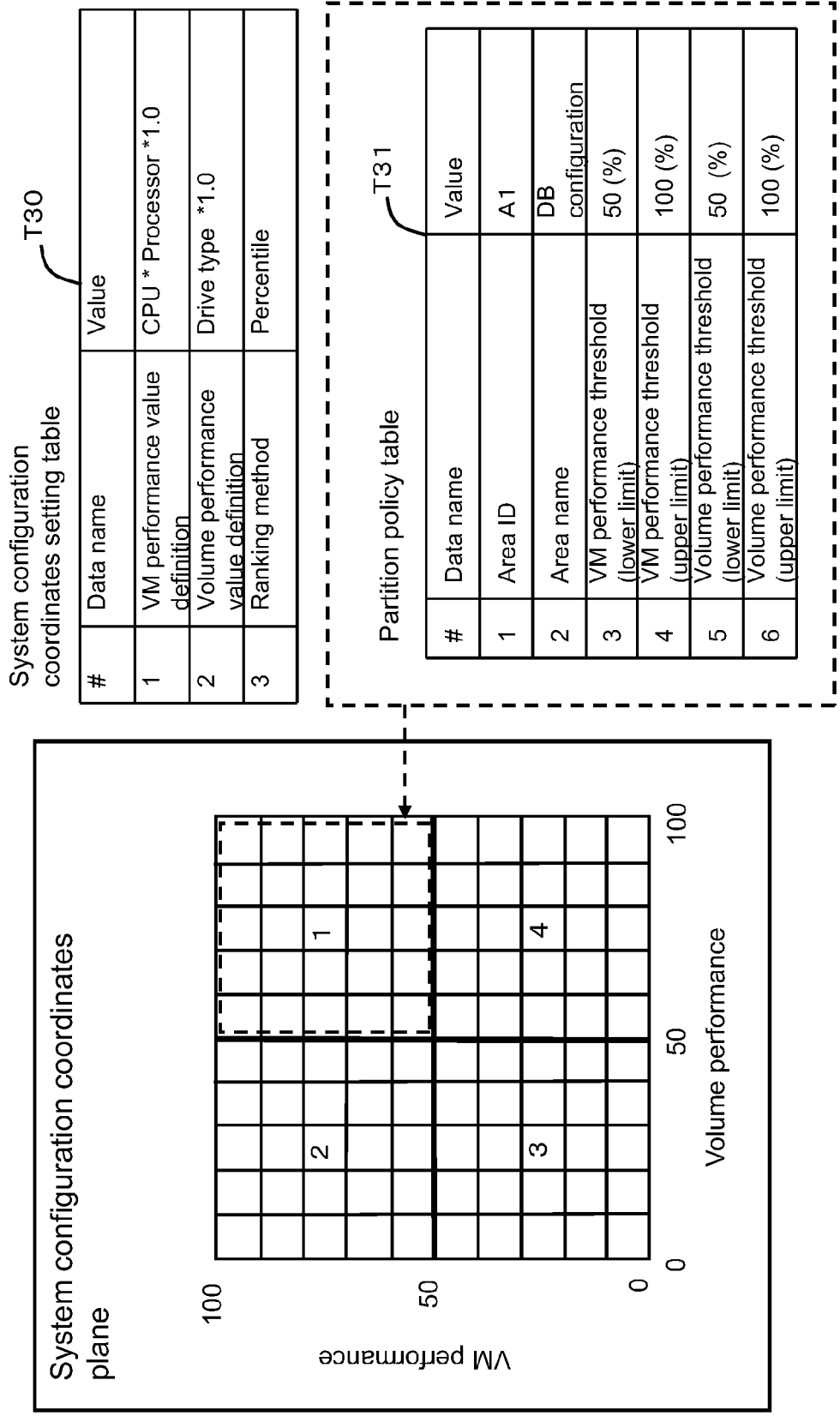
FIG. 19 is a schematic diagram showing how to create areas.

This example will be explained more specifically below by referring to FIGS. 19 through 32. FIG. 19 shows how to define the coordinate plane of the system configurations.

Figure 20:
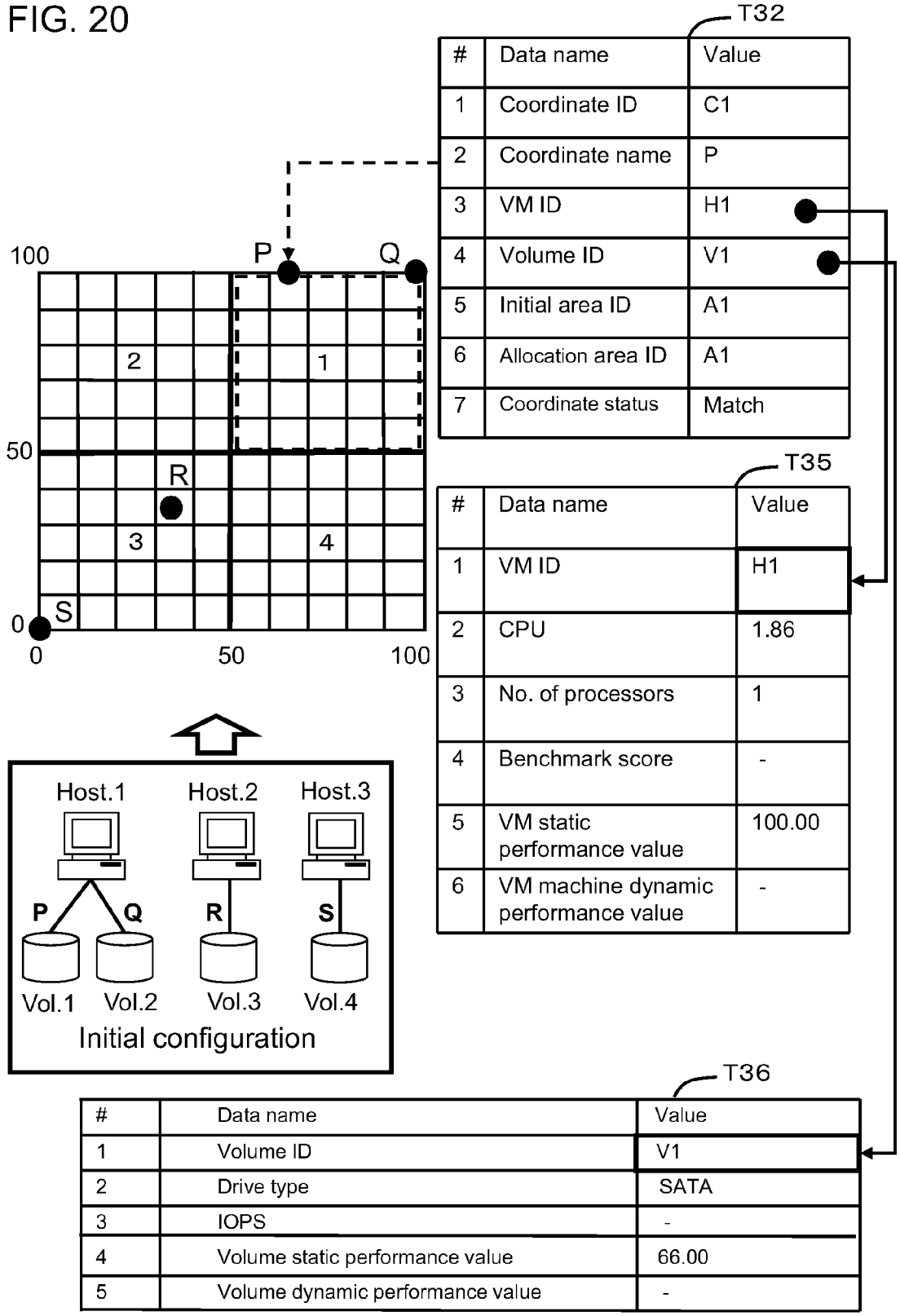
FIG. 20 is a schematic diagram showing how to add a resource to the computer system.

FIG. 20 shows how to map the system configurations (resource(s) and resource pair(s)) of the computer system on the coordinate plane. There are multiple methods for computing a coordinate location, and, for example, a coordinate can be computed using the following method. A percentile will be used as the ranking method. Ranking may also be done using another method.

As a prerequisite, it is supposed that the coordinates of the coordinate plane are (0, 0) through (100, 100). In addition, it is also supposed that the Y coordinates represent virtual machine performance, and the X coordinates represent volume performance (may also be the opposite). In addition, it is supposed that the number of virtual machines registered in the configuration management program P30 is n (where n>1). In addition, the virtual machine performance ranking will be computed based on the virtual machine performance value definition C300. For example, rankings will be assigned from the CPU with the largest number of clocks. The preceding are the prerequisites.

The management server 30 configures the lowest-ranking virtual machine performance value to 0, and configures the highest-ranking virtual machine performance value (y_max) to 100.

Next, the management server 30 finds the virtual machine performance value interval (y_intvl) in accordance with Formula 1.

$$y\_intvl = y\_max/(n-1) \quad \text{(Formula 1)}$$

The management server 30 makes the allocation target ranking (Rankings are allocated from #1).

The management server 30 uses Formula 2 to compute the y coordinate of ranking #i exclusive of the lowest ranking and the highest ranking.

$$y(i) = y\_intvl*(n-i) \quad \text{(Formula 2)}$$

The management server 30 also computes the coordinate for a logical volume the same as above.

Figure 21:
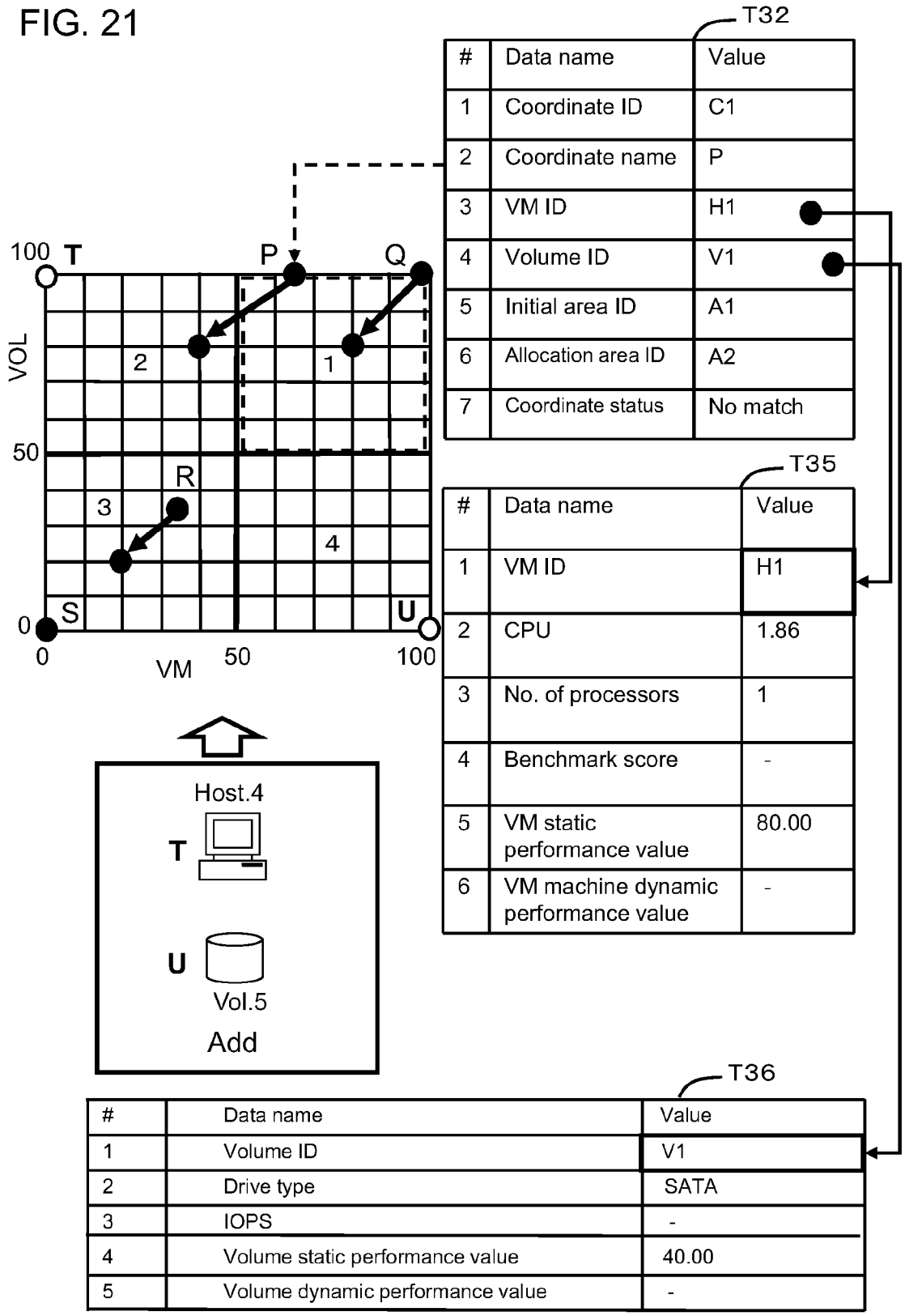
FIG. 21 is a schematic diagram showing how to change the relative location of an existing resource as the result of a new resource having been added to the computer system.

FIG. 21 shows how to add a new virtual machine and a new logical volume to the computer system. The relative performance of the added virtual machine is high, namely 100%, and the relative performance of the added logical volume is also high, namely 100%. For this reason, the performance of the existing system configurations is reduced in relative terms. The initial area of coordinate P was area 1, but subsequent to the addition of the virtual machine and logical volume, coordinate P belongs to area 2. Therefore, the coordinate status of coordinate P becomes "no match". Alternatively, since coordinate Q and coordinate R have moved within the same area, the coordinate statuses for these coordinates is "match".

Figure 22:
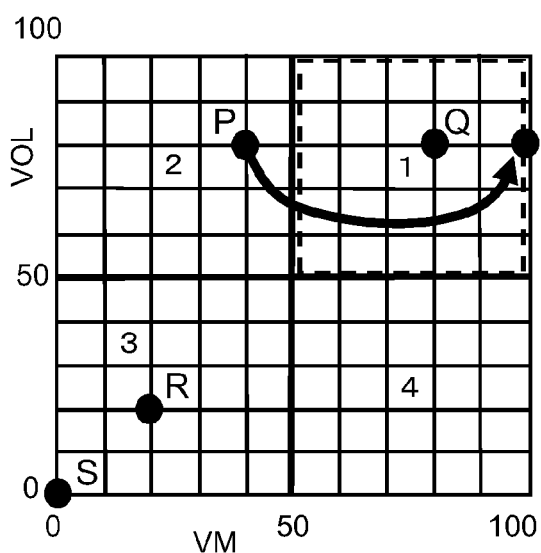
FIG. 22 is a schematic diagram showing how to return a resource pair to an original area.

FIG. 22 shows a case in which a migration plan has been executed. Or, shows how to present a migration plan to the system administrator. To make the area (allocation area) to which the coordinate P belongs match the initial area, the logical volume comprising the coordinate P is migrated to a high-performance logical volume.

The migration-destination logical volume is an unused logical volume that will make it possible for the area to which the coordinate P belongs to match the initial area, and, in addition, is selected from among logical volumes that satisfy a prescribed volume condition. The prescribed volume condition, for example, may be that the migration-source logical volume and the migration-destination logical volume be the same emulation type, or that the size of the migration-source logical volume and the size of the migration-destination logical volume match (in certain cases, the size of the migration-destination volume may be larger than the size of the migration-source volume).

Examples of changes to the management tables will be explained by referring to FIGS. 23 through 32. FIG. 23 shows the virtual machine table T33 and the virtual machine performance table T35 in a case where a virtual machine has been added to the computer system.

Compared to FIG. 8, a total of four virtual machines indicated by virtual machine IDs (H9) through (H12) have been added in FIG. 23. The three virtual machines of virtual machine IDs (H10) through (H12) are empty virtual machines, as denoted in the virtual machine name C331. For the sake of convenience, the virtual machine 100 of virtual machine ID (H9) may be expressed as virtual machine (H9). The same holds true for the logical volume.

The one virtual machine (H9) is actually created using the physical CPU and physical memory of the virtualization server 10 (VServer D). In addition, three virtual machines are capable of being created using the remaining portions of this physical CPU and this physical memory. Consequently, in this example, the virtual machines (H10) through (H12), which are capable of being created using these surplus physical resources, are registered in advance in the tables T33 and T35.

FIG. 24 shows the volume table T34 and the volume performance table T36 in a case where a logical volume has been added to the computer system. Compared to FIG. 9, a total of four logical volumes denoted by the volume IDs (V5) through (V8) have been added in FIG. 24.

FIG. 25 shows the coordinates table T32 in a case where a resource has been added to the computer system. Compared to FIG. 7, a total of seven coordinates denoted by the coordinate IDs (C9) through (C15) have been added in FIG. 25. Of these, the coordinate ID (C9) is a pair coordinate comprising a pair made up of virtual machine (H9) and logical volume (V8).

The pair coordinate, as described hereinabove, is controlled so that the area to which this pair coordinate belongs (the area to which it is currently allocated) matches the initial area. Therefore, initial area ID (A1) and allocation area ID (A1) are configured with respect to the coordinate ID (C9).

The other coordinate IDs (C10) through (C15) are either single virtual machines (C10, C11, C12) or single logical volumes (C13, C14, C15). The coordinate IDs (C10) through (C15) are not pair coordinates, but rather single coordinates denoting single system configurations. The area to which a single coordinate belongs does not have to match the initial area. Therefore, values have not been configured in the initial area ID C324 for the coordinate IDs (C10) through (C15).

The initial area IDs and the allocation area IDs of the coordinate IDs (C3), (C4) and (C7) do not match. Therefore, "no match" is configured in the coordinate status C326 with respect to the coordinate IDs (C3), (C4) and (C7).

FIG. 26 shows the coordinates table T32 in a case where a resource for configuring a pair has been migrated in order to match the allocation area to the initial area.

The coordinate IDs (C3), (C4) and (C7) for which the coordinate status "no match" has been configured in FIG. 25 will be the focus. In FIG. 26, the coordinate status C326 of the coordinate IDs (C3), (C4) and (C7) changes to "match".

The coordinate ID (C3) of FIG. 25 had denoted a pair configuration comprising the virtual machine (H3) and the logical volume (V2). In FIG. 26, the coordinate ID (C3) has changed to a coordinate denoting a pair comprising the virtual machine (H10) and the logical volume (V5). This indicates that a migration was carried out from the virtual machine (H3) to the virtual machine (H10), and that a migration was carried out from the logical volume (V2) to the logical volume (V5).

The coordinate ID (C4) of FIG. 25 had denoted a pair comprising the virtual machine (H4) and the logical volume (V3). In FIG. 26, the coordinate ID (C4) has changed to a coordinate denoting a pair comprising the virtual machine (H11) and the logical volume (V3). This indicates that a migration was carried out from the virtual machine (H4) to the virtual machine (H11). The logical volume was not migrated.

The coordinate ID (C7) of FIG. 25 was a coordinate denoting a pair comprising the virtual machine (H7) and the logical volume (V4). The coordinate ID (C7) of FIG. 26 has changed to a coordinate denoting a pair comprising the virtual machine (H7) and the logical volume (V6). This indicates that a migration was carried out from the logical volume (V4) to the logical volume (V6). The virtual machine was not migrated.

The virtual machines (H10) and (H11), which were added as the coordinate IDs (C10) and (C11) at the bottom of FIG. 25, were used to configure portions of pairs in the coordinate IDs (C3) and (C4) of FIG. 26. Therefore, the coordinate IDs (C10) and (C11) of FIG. 25 have been deleted in FIG. 26. Similarly, the logical volumes (V5) and (V6), which were added as the coordinate IDs (C13) and (C14) at the bottom of FIG. 25, were used to configure portions of pairs in the coordinate IDs (C3) and (C7) of FIG. 26. Therefore, the coordinate IDs (C13) and (C14) of FIG. 25 have been deleted in FIG. 26.

By contrast, the virtual machines (H3) and (H4) and the logical volumes (V2) and (V4), which were used as portions of the pairs in the coordinate IDs (C3), (C4) and (C7) of FIG. 25, were separated from the pairs and transitioned to single system configurations in accordance with the completion of the resource migrations. Therefore, in FIG. 26, the virtual machines (H3) and (H4) and the logical volumes (V2) and (V4) are displayed as coordinate IDs (C16) through (C19) denoting single system configurations.

FIG. 27 shows the virtual machine table T33 and the virtual machine performance table T35 in a case where a resource migration has been completed. Comparing FIG. 23 to FIG. 27, the virtual machine IDs (H3) and (H4) of FIG. 23 were actual virtual machines, but the virtual machines (H3) and (H4) of FIG. 27 have transitioned to empty virtual machines. As was described using FIG. 26, this is because the virtual machines of virtual machine IDs (H3) and (H4) were separated from the pair configurations and returned to the unused state.

In this example, an unneeded virtual machine is eliminated. This is so the physical resources of the virtualization server 10 can be used effectively. The virtual machine is eliminated, but is registered in the tables T33 and T35 as an empty virtual machine so that it can be used at any time.

In FIG. 23, the virtual machine IDs (H10) and (H11) are empty virtual machines. Alternatively, in FIG. 27, the virtual machine IDs (H10) and (H11) have become actual virtual machines. As was described using FIG. 26, this is because the virtual machines of the virtual machine IDs (H10) and (H11) were used as portions of pair configurations. Managing empty virtual machines in this way makes it possible to immediately create a virtual machine at the time of a resource migration for use as a portion of a pair.

FIG. 28 shows the virtual machine table T33 and the virtual machine performance table T35 in a case where the definition of the virtual machine performance value has changed. FIG. 29 shows the volume table T34 and the volume performance table T36 in a case where the definition of the logical volume performance value has changed.

As was described using FIG. 5, the index for evaluating the performance of the virtual machine and the performance of the logical volume can be changed as needed by the system administrator.

For example, the system administrator is able to switch from a static performance index (the number of CPU clocks, the drive type, and so forth) to a dynamic performance index (a benchmark score, IOPS, and so forth). In certain cases, the system administrator can change either all or a portion of the static performance index and continue to use the static performance index, or change either all or a portion of the dynamic performance index and continue to use the dynamic performance index.

In a case where the computer system has only been in operation for a short time, sufficient performance data has yet to be accumulated on the basis of the dynamic performance index. Therefore, the system administrator manages the resources of the computer system (the virtual machines and logical volumes) based on the static performance index. Then, when sufficient performance data has been accumulated on the basis of the dynamic performance index, the system administrator switches from the static performance index to the dynamic performance index. This makes it possible to efficiently manage the resources in line with the actual state of the computer system. Furthermore, the virtual machines may be managed using the dynamic performance index, and the logical volumes may be managed using the static performance index, and conversely, the virtual machines may be managed using the static performance index, and the logical volumes may be managed using the dynamic performance index.

FIG. 30 shows the coordinates table T32 in a case where the definition of the performance value has been changed. When the performance value definition of the coordinates setting table T30 is changed, the management server 30 re-evaluates the respective coordinates. There may be cases in which the coordinate status changes from "match" to "no match" as a result of this re-evaluation. Comparing FIG. 26 to FIG. 30, the coordinate status C326 of the coordinate IDs (C1), (C7) and (C9) changes from "match" to "no match".

FIG. 31 shows the coordinates table T32 in a case where a resource has been migrated subsequent to the performance value definition being changed. Comparing FIG. 30 to FIG. 31, the coordinate status C326 of the coordinate IDs (C1), (C7) and (C9) changes from "no match" to "match".

FIG. 32 shows the virtual machine table T33 and the virtual machine performance table T35 in a case where a resource has been migrated subsequent to the performance value definition being changed.

Configuring this example like this makes it possible to automatically determine whether or not resource combinations in a computer system comprising multiple resources are being used appropriately, and to output the result of this determination.

In addition, in this example, it is possible to provide a combination of resources suited to each type of work process having different performance requirements even in a case where the configuration of the computer system has changed. In particular, a combination of a virtual machine and a logical volume corresponding to the performance requirements of a work process can be allocated to the work process even in a case where the configuration has changed in a large-scale computer system comprising a large number of virtual machines and a large number of logical volumes.

EXAMPLE 2

A second example will be explained by referring to FIGS. 33 and 34. This example is a variation of the first example. Therefore, the following explanation will focus on the differences with the first example.

Figure 33:
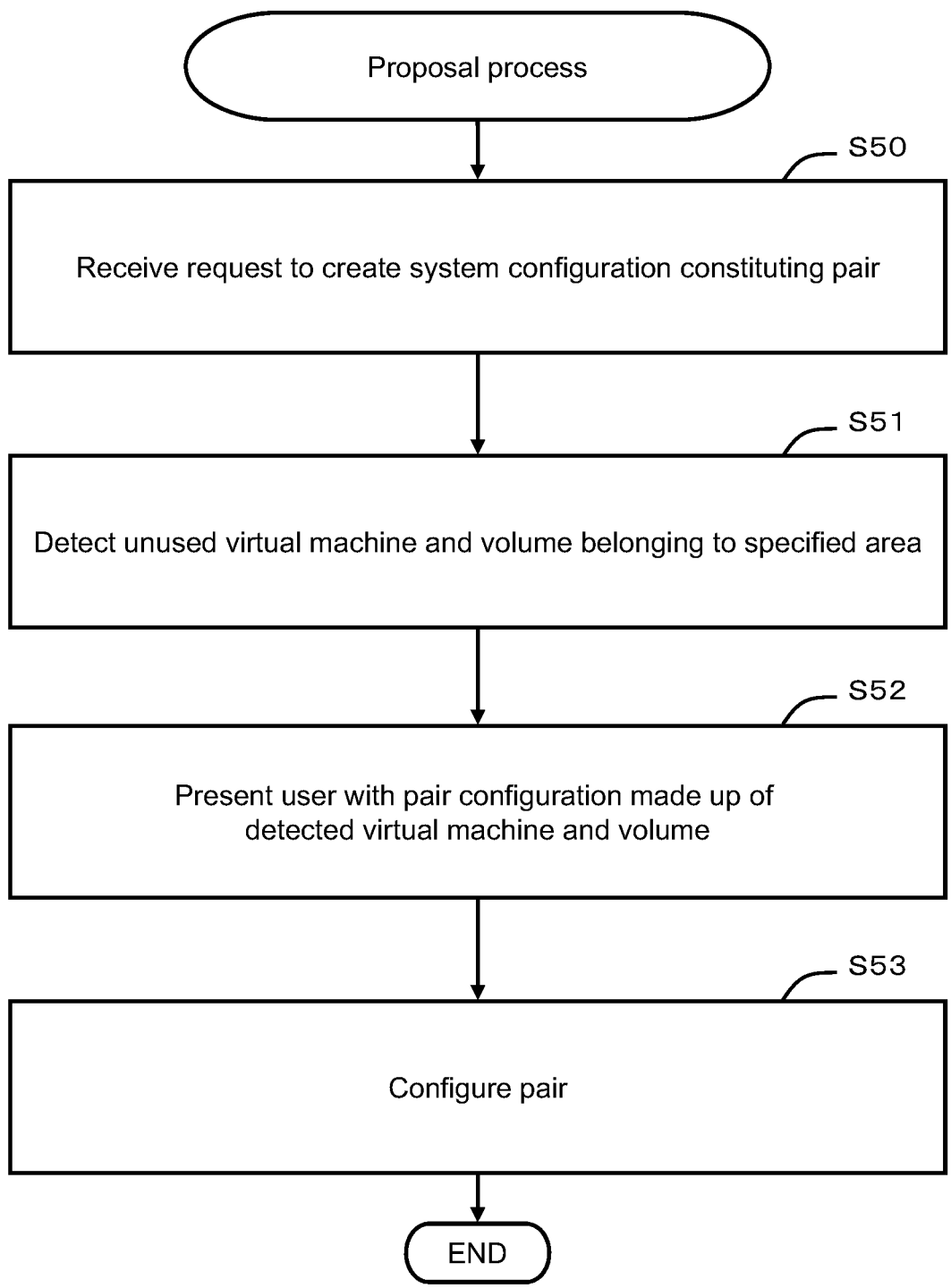
FIG. 33 is a flowchart of processing for proposing resources that will become a pair.

FIG. 33 is a flowchart of a process for proposing a pair configuration to the system administrator. The system administrator requests that the management server 30 create a system configuration constituting a pair (S50). This request includes information for identifying a system administrator-specified area.

The management server 30 detects an unused logical volume 232 and an empty virtual machine 100 belonging to the specified area (S51). The management server 30 displays the coordinate denoting the pair comprising the detected unused logical volume 232 and empty virtual machine 100 on the coordinate plane as shown in FIG. 34 (S52). When the user has confirmed and approved the pair coordinate, the management server 30 configures the approved pair (S53). That is, the management server 30 changes the empty virtual machine approved by the user into an actual virtual machine, and configures a communication path between this virtual machine and the unused logical volume 232.

Figure 34:
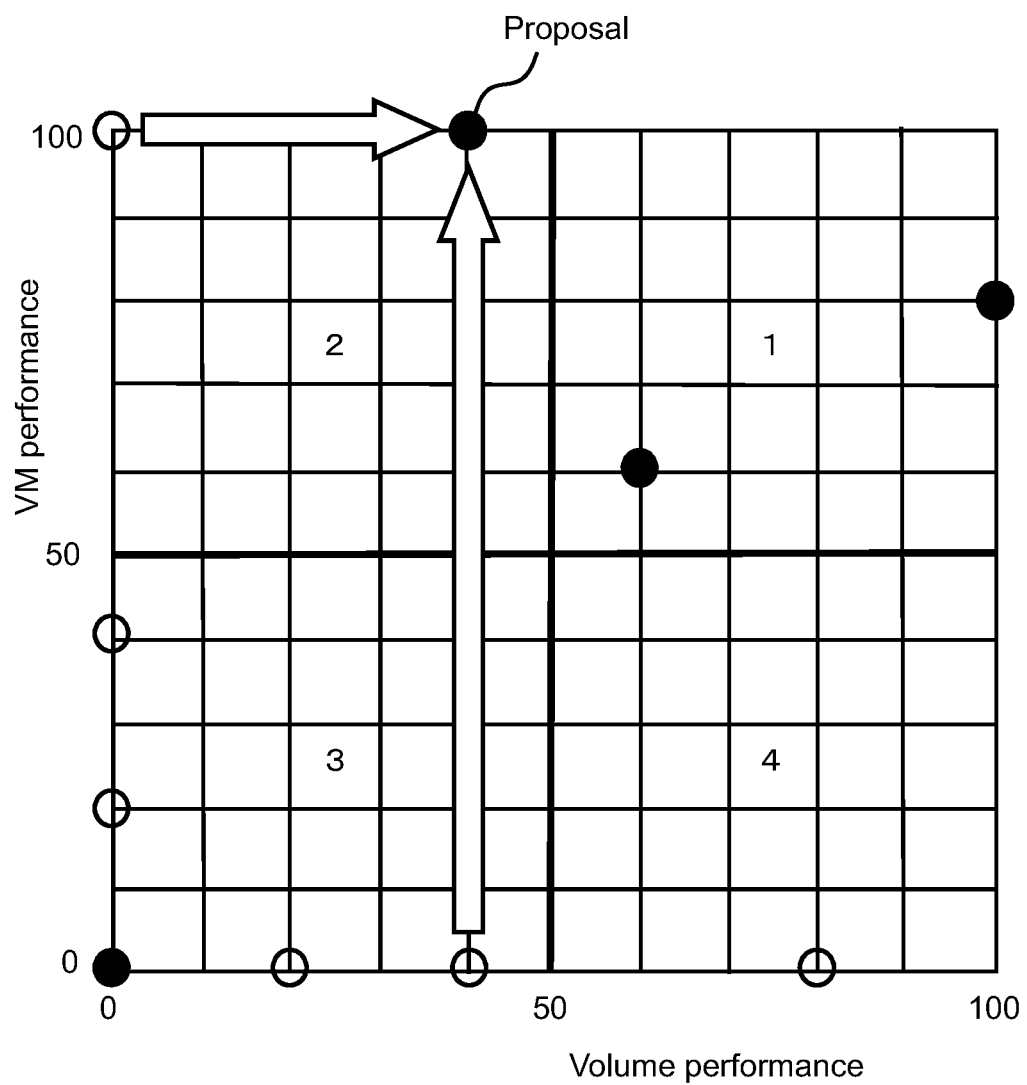
FIG. 34 is an example of a screen for presenting resources that will become a pair.

FIG. 34 shows a case in which the system administrator has specified "area 2". When the system administrator specifies area 2, the management server 30 creates and presents a pair candidate from among the unused logical volume(s) and empty virtual machine(s) belonging to area 2.

There are multiple methods for presenting the pair configuration candidate. For example, only the one highest performance pair in the specified area may be presented, or all of the pairs that are capable of being created in the specified area may be presented, or only a prescribed number of all the pairs beginning with that having the highest performance may be presented.

Configuring this example like this achieves the same effect as the first example. In addition, in this example, in a case where a new work process is to be executed on the computer system, the system administrator is able to obtain a virtual machine-logical volume pair well suited to this work process by simply specifying an area suited to this work process. Therefore, this saves the system administrator time and effort, thereby enhancing usability.

Furthermore, the present invention is not limited to the embodiment described hereinabove. A person with ordinary skill in the art will be able to make various additions and changes without departing from the scope of the present invention.

For example, the above-described embodiment can also be understood as a management program for managing a computer system as follows.

"A computer program, which runs on a computer that manages a computer system comprising multiple computers, which comprise one or more virtual computers, and one or more storage apparatuses, which comprise multiple logical volumes, the computer program causing the computer to operate to:

configure a coordinate plane, which comprises a first axis denoting a virtual computer performance value, which is a performance value that is determined relatively from among the virtual computers included in the computer system, and a second axis denoting a volume performance value, which is a performance value that is determined relatively from among the logical volumes included in the computer system;

dispose multiple areas in the coordinate plane in accordance with a prescribed criterion;

compute the virtual computer performance value with respect to the virtual computers;

compute the volume performance value with respect to the logical volumes;

determine to which area of the areas a pair of a virtual computer and a logical volume from among the virtual computers and the logical volumes belong based on the virtual computer performance value computed with respect to the virtual computer comprising the pair and the volume performance value computed with respect to the logical volume comprising the pair, and store the determined area as an initial area;

respectively recompute at a prescribed time the virtual computer performance value with respect to the virtual computer comprising the pair and the volume performance value with respect to the logical volume comprising the pair;

redetermine to which area of the areas the pair belongs based on the recomputed virtual computer performance value and volume performance value, and store the redetermined area as a latest area;

determine whether or not the initial area and the latest area match; and output information to effect that there is no match in a case where the initial area and the latest area do not match."

In the above-mentioned embodiment, a virtual machine and a logical volume were given as examples of computer system resources. In addition, a switch may also be managed as a resource. In a case where a switch is also managed, for example, it is possible to either configure a coordinate plane from the virtual machine performance and the switch performance, or to configure a coordinate plane from the logical volume performance and the switch performance. As the switch performance, for example, pps (packets per second) can be used as the index. The pps is the number of frames that the switch is able to process per second.

The switch comprises multiple (for example 64) ports. The management server 30 manages the resource in switch port units. For example, the management server 30 manages resources in port units such as a pair of the virtual machine and the switch SW1 first port and another pair of the virtual machine and the switch SW1 second port. A case in which the virtual machine-switch pair moves to an area that differs from the initial area as the result of a new switch having been introduced into the computer system will be considered. In this case, the system administrator can make a proposal such that the port of the switch to which the virtual machine is connected be switched to another switch port.

A case was given in which the management server of this embodiment manages the virtual machine and the logical volume, but the management server 30 can also manage a resource other than these. A configuration like this, for example, is expressed as follows.

"A management computer, which manages a computer system comprising multiple first resources and multiple second resources, comprising:

a communication interface for communicating with the first resources and the second resources;

a storage device for storing a prescribed computer program; and a microprocessor for reading and executing the prescribed computer program from the storage device, wherein the microprocessor, by executing the prescribed computer program:

configures a coordinate plane, which comprises a first axis denoting a first resource performance value, which is a performance value that is determined relatively from among the first resources included in the computer system, and a second axis denoting a second resource performance value, which is a performance value that is determined relatively from among the second resources included in the computer system;

disposes multiple areas in the coordinate plane in accordance with a prescribed criterion;

computes the first resource performance value with respect to the first resources;

computes the second resource performance value with respect to the second resources;

determines to which area of the areas a pair of a first resource and a second resource from among the first resources and the second resources belongs based on the first resource performance value computed with respect to the first resource comprising the pair and the second resource performance value computed with respect to the second resource comprising the pair, and stores the determined area as an initial area;

respectively recomputes at a prescribed time the first resource performance value with respect to the first resource comprising the pair and the second resource performance value with respect to the second resource comprising the pair;

redetermines to which area of the areas the pair belongs based on the recomputed first resource performance value and second resource performance value, and stores the determined area as a latest area;

determines whether or not the initial area and the latest area match; and outputs information to effect that there is no match in a case where the initial area and the latest area do not match."

Furthermore, in the above-mentioned embodiment, the explanation gave as an example a case in which a virtual machine was managed, but the configuration may be such that a physical computer is managed.

REFERENCE SIGNS LIST

1 Virtual machine
2 Logical volume
3 Management server
10 Virtualization server
20 Storage apparatus
30 Management server
40 Client server

The invention claimed is:

1. A management computer for managing a computer system, the management computer comprising:
   a communication interface for communicating with multiple computers comprising one or more virtual computers, and one or more storage apparatuses comprising multiple logical volumes;
   a storage device for storing a prescribed computer program; and
   a microprocessor for reading and executing the prescribed computer program from the storage device,
   wherein the microprocessor, by executing the prescribed computer program:
   configures a coordinate plane, which comprises a first axis denoting a virtual computer performance value, which is a performance value that is determined relatively from among the virtual computers included in the computer system, and a second axis denoting a volume performance value, which is a performance value that is determined relatively from among the logical volumes included in the computer system;
   disposes multiple areas in the coordinate plane in accordance with a prescribed criterion;
   computes the virtual computer performance value with respect to the virtual computers;
   computes the volume performance value with respect to the logical volumes;
   determines to which area of the areas a pair of a virtual computer and a logical volume from among the virtual computers and the logical volumes belongs based on the virtual computer performance value computed with respect to the virtual computer comprising the pair and the volume performance value computed with respect to the logical volume comprising the pair, and stores the determined area as an initial area;
   respectively recomputes at a prescribed time the virtual computer performance value with respect to the virtual computer comprising the pair and the volume performance value with respect to the logical volume comprising the pair;
   redetermines to which area of the areas the pair belongs based on the recomputed virtual computer performance value and volume performance value, and stores the redetermined area as a latest area;
   determines whether or not the initial area and the latest area match; and
   outputs information to effect that there is no match in a case where the initial area and the latest area do not match.

2. A management computer according to claim 1, wherein the prescribed criterion is configured in accordance with performance requirements of each type of work,
   the microprocessor, in a case where the initial area and the latest area do not match, creates a migration plan for matching the latest area to the initial area, and
   the migration plan comprises at least one of a virtual computer migration plan for migrating the virtual computer comprising the pair to another virtual computer among the virtual computers, and a volume migration plan for migrating the logical volume comprising the pair to another logical volume among the logical volumes.

3. A management computer according to claim 2, wherein the virtual computer performance value is selected from one of a virtual computer performance value based on a first virtual computer performance index, and a virtual computer performance value based on a second virtual computer performance index, and
   the volume performance value is selected from one of a volume performance value based on a first volume performance index, or a volume performance value based on a second volume performance index.

4. A management computer according to claim 3, wherein the prescribed time includes a case in which the first virtual computer performance index and the second virtual computer performance index are switched, and a case in which the first volume performance index and the second volume performance index are switched.

5. A management computer according to claim 4, wherein the first virtual computer performance index is a static index determined at a time when the virtual computer is created,
   the second virtual computer performance index is a dynamic index, which changes in accordance with use of the virtual computer,
   the first volume performance index is a static index determined at a time when the logical volume is created, and
   the second volume performance index is a dynamic index, which changes in accordance with use of the logical volume.

6. A management computer according to claim 3, wherein the prescribed time includes a time when a configuration of the computer system is changed.

7. A management computer according to claim 2, wherein the microprocessor executes the migration plan by issuing an instruction based on the migration plan to at least one of the computers or the storage apparatuses.

8. A management computer according to claim 2, wherein the pair is provided in plurality, and the microprocessor creates the migration plan so as to maximize the number of pairs for which the initial area and the latest area match.

9. A management computer according to claim 2, wherein the microprocessor executes the migration plan while continuing a work process utilizing the virtual computer and the logical volume, which comprise the pair.

10. A management computer according to claim 2, wherein the microprocessor creates and displays the multiple migration plans.

11. A management computer according to claim 2, wherein the microprocessor configures, from among the virtual computers, a location on the first axis of a single virtual computer, which does not comprise the pair, and configures, from among the logical volumes, a location on the second axis of a single logical volume, which does not comprise the pair, and the microprocessor displays a location of the pair, the location of the single virtual computer, and the location of the single logical volume on the coordinate plane.

12. A management computer according to claim 11, wherein the microprocessor outputs at least one combination of the single virtual computer and the single logical volume included in a specified area from among the areas.

13. A management computer according to claim 2, wherein the prescribed criterion can be configured in accordance with performance required by a work process suited to each of the areas.

14. A management computer according to claim 2, wherein the virtual computer performance value and the volume performance value are expressed using a percentile format.

15. A management method for managing a computer system, the computer system including multiple computers comprising one or more virtual computers, one or more storage apparatuses comprising multiple logical volumes, and a management computer, the management method comprising:

the management computer configuring a coordinate plane, which comprises a first axis denoting a virtual computer performance value, which is a performance value that is determined relatively from among the virtual computers included in the computer system, and a second axis denoting a volume performance value, which is a performance value that is determined relatively from among the logical volumes included in the computer system;

disposing multiple areas in the coordinate plane in accordance with a prescribed criterion;

computing the virtual computer performance value with respect to the virtual computers;

computing the volume performance value with respect to the logical volumes;

determining to which area of the areas a pair of a virtual computer and a logical volume from among the virtual computers and the logical volumes belongs based on the virtual computer performance value computed with respect to the virtual computer comprising the pair and the volume performance value computed with respect to the logical volume comprising the pair, and stores the determined area as an initial area;

respectively recomputing at a prescribed time the virtual computer performance value with respect to the virtual computer comprising the pair and the volume performance value with respect to the logical volume comprising the pair;

redetermining to which area of the areas the pair belongs based on the recomputed virtual computer performance value and volume performance value, and storing the redetermined area as a latest area;

determining whether or not the initial area and the latest area match; and outputting information to effect that there is no match in a case where the initial area and the latest area does not match.

* * * * *